US012748758B2

(12) United States Patent
Daynes et al.

(10) Patent No.: US 12,748,758 B2
(45) Date of Patent: Sep. 29, 2026

(54) APPLYING TOPOLOGICAL GRAPH CHANGES

(71) Applicant: Oracle International Corporation, Redwood Shores, CA (US)

(72) Inventors: Laurent Daynes, Saint-Ismier (FR); Martin Brugnara, Zurich (CH); Jean-Pierre Lozi, Zurich (CH); Calin Iorgulescu, Zurich (CH); Marco Arnaboldi, Zurich (CH); Hugo Kapp, Zurich (CH); Vlad Ioan Haprian, Zurich (CH); Zhen Hua Liu, San Mateo, CA (US); Sungpack Hong, Palo Alto, CA (US)

(73) Assignee: Oracle International Corporation, Campbell, CA (US)

( * ) Notice: Subject to any disclaimer, the term of this patent is extended or adjusted under 35 U.S.C. 154(b) by 0 days.

(21) Appl. No.: 18/385,617

(22) Filed: Oct. 31, 2023

(65) Prior Publication Data

US 2025/0139096 A1 May 1, 2025

(51) Int. Cl.
*G06F 16/2455* (2019.01)
*G06F 16/22* (2019.01)
*G06F 16/23* (2019.01)

(52) U.S. Cl.
CPC .... *G06F 16/24552* (2019.01); *G06F 16/2272* (2019.01); *G06F 16/2358* (2019.01); *G06F 16/2365* (2019.01)

(58) Field of Classification Search
CPC ........... G06F 16/24552; G06F 16/2272; G06F 16/2358; G06F 16/2365; G06F 16/9024; G06F 16/24526; G06F 16/28; G06F 16/90335; G06F 16/24542; G06F 3/0638; G06F 3/061
(Continued)

(56) References Cited

U.S. PATENT DOCUMENTS

| | | | |
|---|---|---|---|
| 5,379,419 | A | 1/1995 | Heffernan et al. |
| 5,907,848 | A | 5/1999 | Zaiken |

(Continued)

FOREIGN PATENT DOCUMENTS

| | | | |
|---|---|---|---|
| CN | 107807983 | A | 3/2018 |
| WO | WO2015099562 | A1 | 7/2015 |

OTHER PUBLICATIONS

Wikipedia, the free encyclopedia, "Subgraph isomorphism problem", https://en.wikipedia.org/wiki/Subgraph_isomorphism_problem, last viewed on Jan. 29, 2021, 4 pages.

(Continued)

*Primary Examiner* — Evan Aspinwall
(74) *Attorney, Agent, or Firm* — Hickman Becker Bingham Ledesma LLP

(57) ABSTRACT

Techniques are described for applying topological graph changes and traversing the modified graph. In an implementation, a set of compile processes schedules the graph changes caused by a DML (Data Manipulation Language) statement. Based on the requested graph operation in a received query for graph, a set of graph operation processes generate extensions to the graph that capture the changes to the graph by the DML. The received graph operation(s) are then performed by traversing both the existing graph and the generated extensions.

17 Claims, 13 Drawing Sheets

(58) Field of Classification Search
USPC .......................................................... 707/798
See application file for complete search history.

(56) References Cited

U.S. PATENT DOCUMENTS

| | | | |
|---|---|---|---|
| 5,913,029 | A | 6/1999 | Shostak |
| 6,081,801 | A | 6/2000 | Cochrane et al. |
| 6,216,132 | B1 | 4/2001 | Chandra |
| 6,421,663 | B1 | 7/2002 | Chen et al. |
| 7,328,268 | B1 | 2/2008 | Foltak |
| 8,316,060 | B1 | 11/2012 | Snyder, II |
| 8,918,525 | B2 | 12/2014 | Banes |
| 9,094,299 | B1 | 7/2015 | Rao |
| 9,116,738 | B2 | 8/2015 | Jacob et al. |
| 9,122,513 | B2 | 9/2015 | Jacob et al. |
| 10,268,610 | B1 | 4/2019 | McKenney |
| 10,452,655 | B2 | 10/2019 | Lahorani et al. |
| 10,984,046 | B2 | 4/2021 | Das et al. |
| 11,514,219 | B1 | 11/2022 | Abo Foul et al. |
| 11,704,313 | B1 | 7/2023 | Andrade et al. |
| 2002/0041705 | A1 | 4/2002 | Lin |
| 2002/0178341 | A1 | 11/2002 | Frank |
| 2006/0101001 | A1 | 5/2006 | Lindsay et al. |
| 2006/0248036 | A1 | 11/2006 | Stanev et al. |
| 2007/0043347 | A1 | 2/2007 | Solomita |
| 2008/0153444 | A1 | 6/2008 | Chen |
| 2008/0184197 | A1 | 7/2008 | Dobbins et al. |
| 2008/0281801 | A1 | 11/2008 | Larson et al. |
| 2008/0285945 | A1 | 11/2008 | Rajakarunanayake |
| 2009/0043778 | A1 | 2/2009 | Jambunathan |
| 2010/0036957 | A1 | 2/2010 | Patel |
| 2010/0088666 | A1 | 4/2010 | Box et al. |
| 2010/0211924 | A1 | 8/2010 | Begel et al. |
| 2011/0119245 | A1 | 5/2011 | Sargeant et al. |
| 2011/0267351 | A1 | 11/2011 | Curbera |
| 2011/0270861 | A1 | 11/2011 | Arshavsky et al. |
| 2013/0066952 | A1 | 3/2013 | Colrain |
| 2013/0097307 | A1 | 4/2013 | Vazac |
| 2014/0019490 | A1 | 1/2014 | Roy et al. |
| 2014/0032617 | A1 | 1/2014 | Stanfill |
| 2014/0101117 | A1 | 4/2014 | Uzzaman |
| 2014/0136553 | A1 | 5/2014 | Jacob et al. |
| 2014/0136555 | A1 | 5/2014 | Jacob et al. |
| 2014/0137129 | A1 | 5/2014 | Jacob et al. |
| 2014/0137130 | A1 | 5/2014 | Jacob et al. |
| 2015/0026158 | A1 | 1/2015 | Jin |
| 2015/0089604 | A1 | 3/2015 | Mathew |
| 2015/0310644 | A1 | 10/2015 | Zhou |
| 2016/0019228 | A1* | 1/2016 | Hong .................. G06F 16/2246 707/624 |
| 2016/0063132 | A1* | 3/2016 | Chen ................... G06F 16/9024 707/609 |
| 2016/0071233 | A1 | 3/2016 | Macko et al. |
| 2016/0103931 | A1 | 4/2016 | Appavu |
| 2016/0117358 | A1 | 4/2016 | Schmid et al. |
| 2016/0147814 | A1* | 5/2016 | Goel ................... G06F 16/2336 707/638 |
| 2016/0179420 | A1 | 6/2016 | Mei |
| 2016/0179883 | A1 | 6/2016 | Chen |
| 2016/0188656 | A1 | 6/2016 | Ekanadham et al. |
| 2016/0342708 | A1 | 11/2016 | Fokoue-Nkoutche et al. |
| 2016/0350662 | A1 | 12/2016 | Jin et al. |
| 2017/0046388 | A1 | 2/2017 | Kirk et al. |
| 2017/0060958 | A1 | 3/2017 | Van Rest |
| 2017/0068748 | A1 | 3/2017 | Hu et al. |
| 2017/0076342 | A1 | 3/2017 | Golec et al. |
| 2017/0091246 | A1 | 3/2017 | Risvik |
| 2017/0116271 | A1* | 4/2017 | Ziauddin ........... G06F 16/24539 |
| 2017/0147705 | A1 | 5/2017 | Kasperovics et al. |
| 2017/0169133 | A1 | 6/2017 | Kim |
| 2017/0212691 | A1 | 7/2017 | Katsuki |
| 2017/0339176 | A1 | 11/2017 | Backer |
| 2018/0067987 | A1 | 3/2018 | Kang et al. |
| 2018/0081919 | A1* | 3/2018 | Stanfill ............... G06F 16/9024 |
| 2018/0096000 | A1 | 4/2018 | Harrison et al. |
| 2018/0096035 | A1 | 4/2018 | Kreutzer et al. |
| 2018/0203897 | A1 | 7/2018 | Van Rest |
| 2018/0218088 | A1 | 8/2018 | Fischer et al. |
| 2018/0246986 | A1 | 8/2018 | Haubenschild et al. |
| 2018/0293329 | A1 | 10/2018 | Yanagisawa |
| 2018/0329958 | A1 | 11/2018 | Choudhury |
| 2019/0102267 | A1 | 4/2019 | Giloni |
| 2019/0121810 | A1 | 4/2019 | Zhuang |
| 2019/0205480 | A1 | 7/2019 | Zhang et al. |
| 2019/0213356 | A1 | 7/2019 | Vagujhelyi et al. |
| 2019/0303506 | A1 | 10/2019 | Bross et al. |
| 2019/0311060 | A1 | 10/2019 | Bross et al. |
| 2019/0325075 | A1 | 10/2019 | Hilloulin |
| 2019/0325076 | A1 | 10/2019 | Haglin |
| 2019/0347135 | A1* | 11/2019 | Ravindran ............ G06F 9/5038 |
| 2020/0242167 | A1 | 7/2020 | Broecheler |
| 2020/0364268 | A1 | 11/2020 | Xu et al. |
| 2021/0034615 | A1 | 2/2021 | Chen et al. |
| 2021/0064660 | A1 | 3/2021 | Xu et al. |
| 2021/0149854 | A1 | 5/2021 | Barde et al. |
| 2021/0182285 | A1 | 6/2021 | Haprian |
| 2021/0182315 | A1 | 6/2021 | Haprian |
| 2021/0182316 | A1* | 6/2021 | Haprian .............. G06F 16/9024 |
| 2021/0209104 | A1* | 7/2021 | Franz .................. G06F 16/9024 |
| 2021/0224235 | A1 | 7/2021 | Arnaboldi et al. |
| 2021/0256063 | A1 | 8/2021 | Kasperovics et al. |
| 2021/0286790 | A1 | 9/2021 | Lozi |
| 2022/0129451 | A1 | 4/2022 | Haprian et al. |
| 2022/0129461 | A1 | 4/2022 | Haprian et al. |
| 2022/0129465 | A1 | 4/2022 | Haprian et al. |
| 2022/0245147 | A1* | 8/2022 | Segalini ............ G06F 16/24552 |
| 2022/0284056 | A1* | 9/2022 | Hilloulin ............. G06F 16/9024 |
| 2022/0327127 | A1* | 10/2022 | Anand ................ G06F 16/2433 |
| 2024/0028593 | A1* | 1/2024 | Sharma ............... G06F 16/2264 |

OTHER PUBLICATIONS

Wikipedia, the free encyclopedia, "PageRank", https://en.wikipedia.org/wiki/PageRank, last viewed on Jan. 29, 2021, 16 pages.

Wikipedia, the free encyclopedia, "Isolation (database systems)", https://en.wikipedia.org/wiki/Isolation_(database_systems), last viewed on Jan. 29, 2021, 8 pages.

Wikipedia, the free encyclopedia, "Fetch-and-add", https://en.wikipedia.org/wiki/Fetch-and-add, last viewed on Jan. 29, 2021, 4 pages.

Wikipedia, the free encyclopedia, "Bellman-Ford algorithm", https://en.wikipedia.org/wiki/Bellman%E2%80%93Ford_algorithm, last viewed on Jan. 29, 2021, 6 pages.

Segalini et al., "Patent: efficient identification of vertices and edges for graph indexes in an RDBMS", dated Nov. 2015, 12 pages.

SAP.com, "SAP HANA", Harness the power of an in-memory database with SAP HANA, SAP Business Technology Platform, https://www.sap.com/products/hana.html, last viewed on Jan. 29, 2021, 19 pages.

SAP.com, "SAP HANA Graph Reference", SAP HANA Platform 2.0 SPS 03 Document Version: 1.1 dated Oct. 31, 2018, 84 pages.

SAP HANA, "Graph Workspaces," https://help.sap.com/viewer/f381aa9c4b99457fb3c6b53a2fd29c02/2.0.03/en-US, 1pg.

Microsoft.com, "SQL Server 2019" https://www.microsoft.com/en-us/sql-server/sql-server-2019, last viewed on Jan. 29, 2021, 8 pages.

Microsoft Docs, "Graph processing with SQL Server and Azure SQL Database",docs.microsoft.com/en-us/sql/relational databases/graphs/sql-graph-overview?view=sql-server-ver15, dated Jun. 26, 2019, 5 pgs.

Hong et al., "PGX.D: A Fast Distributed Graph Processing Engine", SC '15, dated Nov. 15-20, 2015, Austin, TX, USA, 12 pages.

Hassan et al., "Extending In-Memory Relational Database Engines with Native Graph Support", Proceedings of the 21st International Conference on Extending Database Technology, dated Mar. 2018, 12 pgs.

Graph Query Language GQL, "GQL Standard", https://www.gqlstandards.org/home, last viewed on Jan. 29, 2021, 2 pages.

Haprian, U.S. Appl. No. 17/080,700, filed Oct. 26, 2020, Final Rejection, Jan. 18, 2023.

(56) References Cited

OTHER PUBLICATIONS

Arnaboldi, U.S. Appl. No. 16/747,827, filed Jan. 21, 2020, Office Action, Apr. 21, 2021.
Haprian, U.S. Appl. No. 16/710,715, filed Dec. 11, 2019, Non-Final Rejection, Nov. 9, 2021.
Haprian, U.S. Appl. No. 16/710,715, filed Dec. 11, 2019, Notice of Allowance and Fees Due, Apr. 28, 2022.
Haprian, U.S. Appl. No. 16/710,715, filed Dec. 11, 2019, Office Action, May 13, 2021.
Haprian, U.S. Appl. No. 16/710,719, filed Dec. 11, 2019, Notice of Allowance and Fees Due, May 11, 2022.
Haprian, U.S. Appl. No. 16/710,719, filed Dec. 11, 2019, Non-Final Rejection, Nov. 24, 2021.
Haprian, U.S. Appl. No. 16/710,719, filed Dec. 11, 2019, Office Action, Jul. 1, 2021.
Haprian, U.S. Appl. No. 16/710,740, filed Dec. 11, 2019, Advisory Action, Feb. 28, 2022.
Haprian, U.S. Appl. No. 16/710,740, filed Dec. 11, 2019, Final Rejection, Dec. 7, 2021.
Haprian, U.S. Appl. No. 16/710,740, filed Dec. 11, 2019, Notice of Allowance and Fees Due, Jun. 23, 2022.
Haprian, U.S. Appl. No. 16/710,740, filed Dec. 11, 2019, Office Action, Jul. 1, 2021.
Haprian, U.S. Appl. No. 17/080,698, filed Oct. 26, 2020, Final Rejection, May 18, 2022.
Arnaboldi, U.S. Appl. No. 16/747,827, filed Jan. 21, 2020, Notice of Allowance, Jun. 9, 2021.
Haprian, U.S. Appl. No. 17/080,698, filed Oct. 26, 2020, Notice of Allowance and Fees Due, Dec. 28, 2022.
Lozi, U.S. Appl. No. 16/816,686, filed Mar. 12, 2020, Notice of Allowance and Fees Due, Sep. 28, 2022.
Haprian, U.S. Appl. No. 17/080,700, filed Oct. 26, 2020, Non-Final Rejection, Sep. 9, 2022.
Haprian, U.S. Appl. No. 17/080,700, filed Oct. 26, 2020, Advisory Action, Mar. 30, 2023.
Haprian, U.S. Appl. No. 17/080,700, filed Oct. 26, 2020, Notice of Allowance and Fees Due, Sep. 21, 2023.
Haprian, U.S. Appl. No. 17/080,719, filed Oct. 26, 2020, Non-Final Rejection, Dec. 14, 2021.
Haprian, U.S. Appl. No. 17/080,719, filed Oct. 26, 2020, Notice of Allowance and Fees Due, Jul. 7, 2022.
Kapp, U.S. Appl. No. 17/584,262, filed Jan. 25, 2022, Non-Final Rejection, Jun. 23, 2023.
Kapp, U.S. Appl. No. 17/584,262, filed Jan. 25, 2022, Notice of Allowance and Fees Due, Oct. 12, 2023.
Kapp, U.S. Appl. No. 17/585,146, filed Jan. 26, 2022, Advisory Action, Dec. 4, 2023.
Kapp, U.S. Appl. No. 17/585,146, filed Jan. 26, 2022, Final Rejection, Oct. 12, 2023.
Kapp, U.S. Appl. No. 17/585,146, filed Jan. 26, 2022, Non-Final Rejection, Mar. 31, 2023.
Lozi, U.S. Appl. No. 16/816,686, filed Mar. 12, 2020, Advisory Action, Jul. 14, 2022.
Lozi, U.S. Appl. No. 16/816,686, filed Mar. 12, 2020, Final Rejection, Jun. 2, 2022.
Lozi, U.S. Appl. No. 16/816,686, filed Mar. 12, 2020, Non-Final Rejection, Jan. 28, 2022.
Haprian, U.S. Appl. No. 17/080,698, filed Oct. 26, 2020, Non-Final Rejection, Dec. 24, 2021.
Michaels, Jan, "Property Graph Data Model—The Proposal", Individual Expert Contribution, dated Jan. 16, 2019, 76 pages.
Adam et al., "A Comparison of List Schedules for Parallel Processing Systems", Communications of the ACM 17(12):685-690, Dec. 1974, pp. 685-690.
Amazon Neptune—Fast, Reliable Graph Database Built for the Cloud, https://aws.amazon.com/neptune/, last viewed on Dec. 11, 2019, 16 pages.
Amazon Neptune, "Overview" https://aws.amazon.com/neptune/, last viewed on Nov. 4, 2020, 20 pages.
Annamalai et al., "PGQL Introduction and Deep Dive", Product Management, Oracle, Jul. 30, 2020, 45 pages.
Apache TinkerPop, The Germlin Grpah Traversal Machine and Language, http://tinkerpop.apache.org/gremlin.html, last viewed on Dec. 11, 2019, 6 pages.
Cypher Query Language Developer Guides and Tutorials, Developer Guides, https://neo4j.com/developer/cypher/, last viewed on Dec. 11, 2019, 5 pages.
Databricks, "Graph Analysis Tutorial with GraphFrames", dated Jul. 21, 2020, https://docs.databricks.com/spark/latest/graph-analysis/graphframes/graph-analysis-tutorial.html, 2 pages.
Deutsch et al., "TigerGraph: A Native MPP Graph Database", Jan. 24, 2019, 28 pages.
Hassan, "Extending In-Memory Relational Database Engines with Native Graph Support", Published in Proceedings of the 21st International Conference on EDBT, https://openproceedings.org/2018/conf/edbt/paper-17.pdf, dated Mar. 2018, 12 pages.
Hassan, Mohamed S., et al., "Empowering In-Memory Relational Database Engines with Native Graph Processing", arXiv:1709.06715v2, Oct. 12, 2017, 15pgs.
Hong et al., "PGX.D: A Fast Distributed Graph Processing Engine", DOI:http://dx.doi.org/10.1145/2807591.2807620, dated Nov. 2015, Austin TX, USA, 12 pages.
"SAP HANA Graph Reference", SAP HANA Platform 2.0 SPS 04 Document Version: 1.1 dated Oct. 31, 2019, SAP.com, 86 pages.
Jindal, Alekh et al. "Graph Analytics Using Vertica Relational Database", 2015 IEEE Intl Conf on Big Data (Big Data), Santa Clara, CA, pp. 1191-1200, doi: 10.1109/BigData.2015.7363873, Oct. 2015, 14pgs.
Zhou et al., "Implementing Database Operations Using SIMD Instructions", ACM SIGMOD 'Jun. 4-6, 2002, Madison, Wisconsin, USA, 12 pages.
Neo4j Graph Database Platform, "Cypher Query Language", https://neo4j.com/developer/cypher/, dated Nov. 4, 2020, 7 pages.
Neo4j Graph Platform, "What is Neo4j?", https://neo4j.com/, last viewed on Nov. 4, 2020, 14 pages.
Oracle Help Center, "ROWID Pseudocolumn", Database SQL Reference, https://docs.oracle.com/cd/B19306_01/server.102/b14200/pseudocolumns008.htm, dated Nov. 20, 2019, 2 pages.
Padmanabhan, "HDB-Subdue, A Relational Database Approach to Graph Mining and Hierarchical Reduction", Dec. 2005, 99 pages.
Paredes et al., "Exploiting Parallelism and Vectorisation in Breadth-First Search for the Intel Xeon Phi", IEEE Transactions on Parallel and Distributed Systems, vol. 31, No. 1, dated Jan. 2020, 16 pages.
PGQL, "Property Graph Query Language", http://pgql-lang.org/, last viewed on Nov. 3, 2020, 5 pages.
Stoica, Radu-Alexandru, "R2PG-DM: A Directly Mapping Relational Databases to Property Graphs", diss. Master's thesis, Eindhoven Univ. of Technology 2019, https://ceur-ws.org/Vol-2369/short06.pdf, Jul. 2019, 24pgs.
Tian et al., "IBM Db2 Graph: Supporting Synergistic and Retrofittable Graph Queries Inside IBM Db2", SIGMOD '20: Proceedings of the 2020 ACM SIGMOD International Conference on Management of Data, Jun. 2020, 15 pages.
TigerGraph, "The Only Scalable Graph Database for the Enterprise", https://www.tigergraph.com/, last viewed on Nov. 4, 2020, 9 pages.
Valiyev, Mahammad, "Graph Storage: How Good is CSR Really?", https://github.com/mehemmedv/DB_Imp_Seminar, dated Dec 10, 2017, 8 pages.
Wheatman et al., "Packed Compressed Sparse Row: A Dynamic Graph Representation", Computer Science and Artificial Intelligence Laboratory Massachusetts Institute of Technology, https://ieeexplore.ieee.org/abstract/document/8547566, dated 2018, 7 pages.
Zemke, Fred, "Fixed Graph Patterns", ISO/IEC SC32/WG3:ERF-035, dated Sep. 14, 2018, 25 pages.
IBM Knowledge Center, "Row ID Values", https://www.ibm.com/support/knowledgecenter/en/SSEPEK_11.0.0/sqlref/src/tpc/db2z_rowidvalues.html, dated Nov. 20, 2019, 3 pages.
Segalini, U.S. Appl. No. 17/162,527, filed Jan. 29, 2021, Notice of Allowance and Fees Due, Aug. 5, 2022.
Segalini, U.S. Appl. No. 17/162,527, filed Jan. 29, 2021, Non-Final Rejection, Mar. 17, 2022.

(56) References Cited

OTHER PUBLICATIONS

Segalini et al., U.S. Appl. No. 17/162,527, filed Jan. 29, 2021, Notice of Allowance and Fees Due, Jun. 24, 2022.
Giloni, U.S. Appl. No. 16/147,367, filed Sep. 28, 2018, Interview Summary, Mar. 19, 2021.
Giloni, U.S. Appl. No. 16/147,367, filed Sep. 28, 2018, Final Office Action, Jan. 13, 2021.
Giloni, U.S. Appl. No. 16/147,367, filed Sep. 28, 2018, Notice of Allowance and Fees Due, Aug. 15, 2022.
Giloni, U.S. Appl. No. 16/147,367, filed Sep. 28, 2018, Non-Final Rejection, Jan. 6, 2022.
Giloni, U.S. Appl. No. 16/147,367, filed Sep. 28, 2018, Office Action, Jul. 9, 2020.
Giloni, U.S. Appl. No. 16/147,367, filed Sep. 28, 2018, Advisory Action, Mar. 24, 2021.

* cited by examiner

APPLYING TOPOLOGICAL GRAPH CHANGES

RELATED APPLICATIONS

This application is related to:

This application is related to: U.S. application Ser. No. 17/162,527 "Efficient Identification of Vertices and Edges For Graph Indexes in an RDBMS," filed on Sep. 28, 2018 now U.S. Pat. No. 11,500,868 issued Nov. 15, 2022, U.S. application Ser. No. 16/147,367 "Efficient Graph Generation" filed on Sep. 28, 2018 now U.S. Pat. No. 11,556,500 issued Jan. 17, 2023, U.S. application Ser. No. 18/385,602 "Modified Graph Extension" filed Oct. 31, 2023, the entire content of each of related applications is hereby entirely incorporated by reference in their entirety as if fully set forth herein.

FIELD OF THE TECHNOLOGY

The present invention relates to the field of electronic database management, in particular, to applying topological graph changes to graph data and generating extensions for the modified graphs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Graph processing is an important tool for data analytics. Database management systems (DBMS) increasingly allow users to define property graphs from database objects, e.g., relational tables, and to query them using graph pattern matching queries. Graph querying and pattern matching enable interactive exploration of graphs, similar to how SQL (Structured Query Language) interacts with databases.

However, graph queries are a very challenging workload for a DBMS as the execution is focused on edges, i.e., the connections in the data. Therefore, executing graph queries might explore immense amounts of intermediate results, and queries can quickly explode in terms of memory usage. Additionally, graph queries exhibit very irregular access patterns with limited memory locality, as the query patterns and the connections in the data dictate the accesses.

One way that relational DBMSs implement graph queries is by translating the graph query into an SQL join query and processing it with their existing SQL engine. This approach is suboptimal. SQL engines do not leverage the graph structure when doing neighbor traversals. Furthermore, most SQL engines do not take advantage of sharing computation across paths of the graph belonging to multiple instantiations of a given path pattern.

Another approach, given that fast-access memory, (also sometimes referred to as "main memory") is becoming cheaper and larger, is for the DBMS to generate graph format data from relational tables stored on disk storage and replicate the data in the graph format in fast-access memory. Such caching allows the graph data to be accessible faster due to the graph format and due to faster memory. Accordingly, the graph queries may be performed in a speedier fashion.

Unfortunately, this technique is subpar due to the lag that occurs between replications. Specifically, at any given point in time, some changes made at one of the replicas will not yet have been applied to the other replica. Consequently, the lag inherent in the replication mechanism may result in unpredictable artifacts and, possibly, incorrect results.

Furthermore, if the burden for the update of the graph is performed by each query that updates, e.g., data manipulation language statement (DML instruction or DML), then the update to the graph(s) may negatively impact the performance of DMLs. Each process(es) executing DML may need to reconstruct the graph to properly update the graph based on the DML instruction. Such a negative impact on DML executions would negatively affect the whole operation of the DBMS, slowing the DBMS considerably.

Also, each transaction generally needs to see its own changes, even before those changes have been committed. However, database changes are not typically replicated until the changes have been committed. Thus, a transaction may be limited to using the replica at which the transaction's uncommitted changes were made, even though the format of the data at the other replica may be more efficient for some operations.

BRIEF DESCRIPTION OF THE DRAWINGS

In the drawings of certain implementations in which like reference numerals refer to corresponding parts throughout the figures.

DETAILED DESCRIPTION

Figure 1:
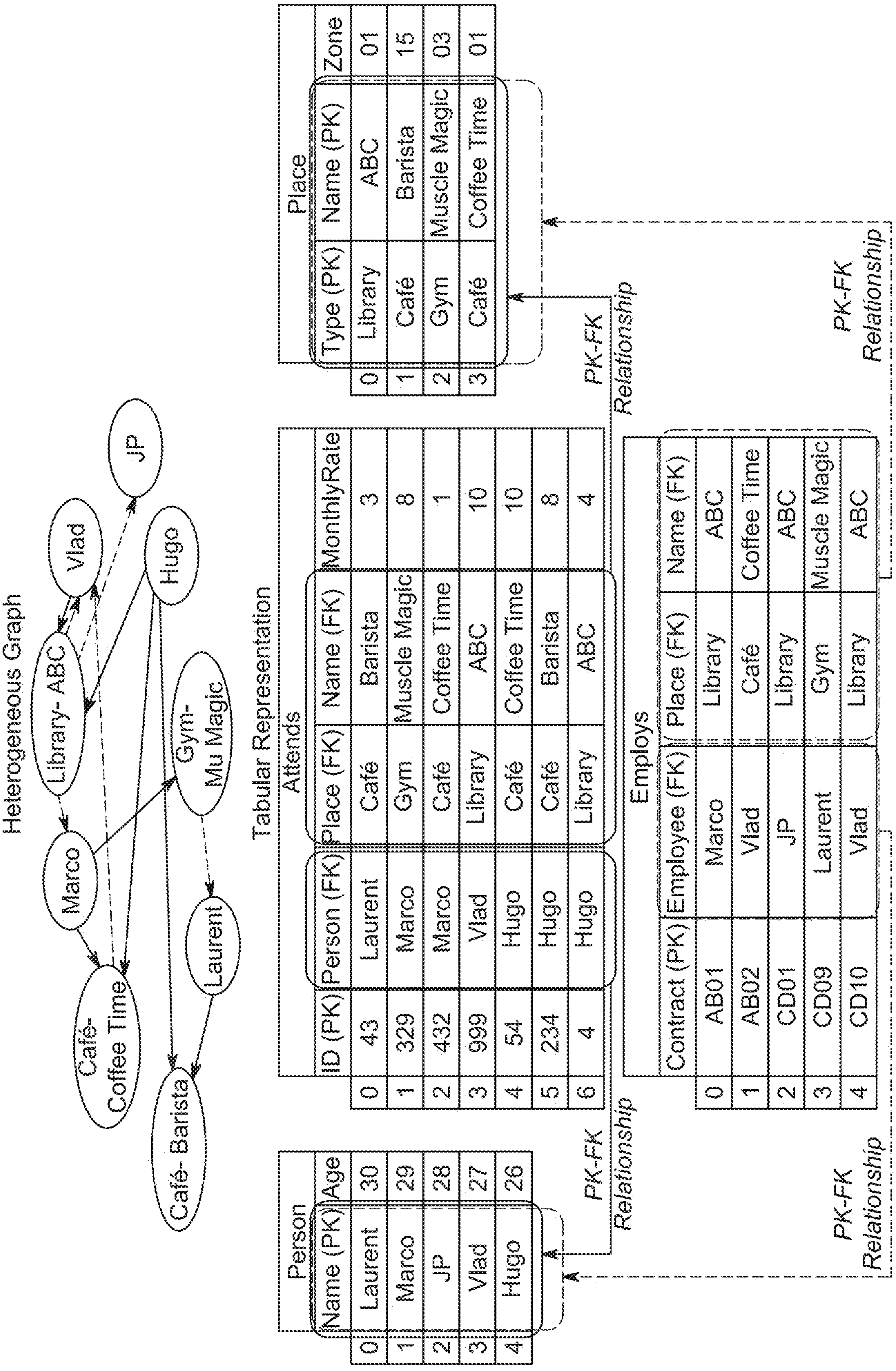
FIG. 1 illustrates an example heterogeneous graph modeled by corresponding RDBMS tables.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches described herein include detecting and recording updates to a graph data structure, referred to herein as a "graph." The graph may be generated from persistently stored data in a database of a DBMS and stored in fast access, main, memory (thus, also referred to herein as "in-memory graph").

Accordingly, to ensure that the in-memory graph reflects the up-to-date data, the in-memory graph has to be updated when any update occurs to the database objects that causes a topological graph change. "Topological graph change" or "graph change" refers herein to changes in the underlying data of the graph that affect the existence of vertices and/or edges of the graph. To keep a graph up-to-date and transactionally consistent, the approaches herein describe detecting graph change transactions and applying the graph changes with minimal effect on the execution of the DML instruction that caused the graph change in the first place.

Furthermore, the approaches enable high concurrency and speedy application of graph changes. For example, the set of processes that performs graph (read) operations may perform the application of the graph changes as well, thereby speeding up the application and lessening the burden for the DML instructions to apply graph changes. The techniques further describe various lightweight time-stamped records that store graph changes per transaction and arrange the changes in a queue for concurrent applications.

Additionally, since rebuilding the graph is a heavy operation, requiring a large amount of input/output operations as well as taking up memory and using up processing time, the techniques describe generating a graph extension to an already generated base graph in response to a graph operation. Thereby, the base graph is infrequently regenerated while a graph extension (which is generally a fraction of the base graph's size because the extension includes only new changes) is generated in response to a graph operation request based on the graph changes necessary for the accurate graph operation. Such graph extension is particular to the requested timestamp of the graph operation request and may be temporarily stored in the private memory.

In-Memory Graph

In an implementation, a base graph (index) data structure is generated at a particular point in time. The point in time is associated with the graph to indicate the timeliness of the data in the graph. The time stamp may be represented by a logical timestamp of the DBMS (e.g., Serial Change Number (SCN)). The graph includes data on source and destination vertices as well as the edges that connect the vertices. Each such element may have a corresponding value and/or identifier.

In an implementation, the elements of the graph originate from a corresponding database object(s) in which the elements are stored as items of the object. For example, the value of each source vertex of a graph may be persistently stored in a table of a database as rows of the table. The destination vertices of a graph may be similarly persistently stored in the same or different table in the same or different database. The edges of the graph may be stored as foreign keys associating the corresponding source and destination pair vertices.

Figure 2:
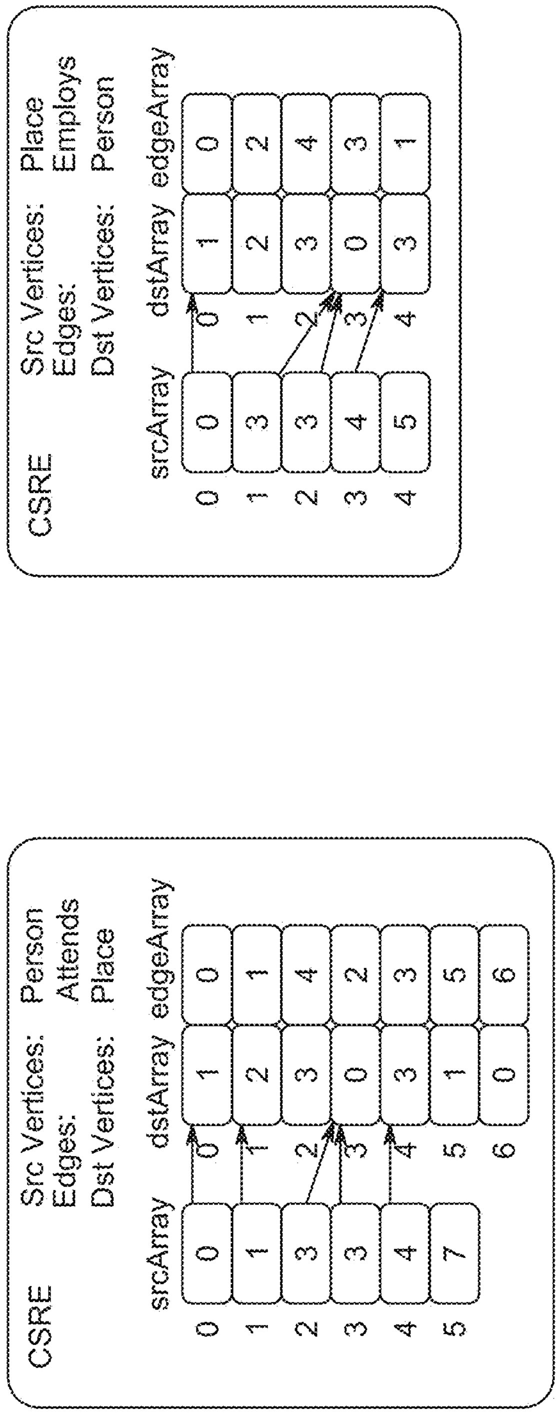
FIG. 2 illustrates CSRE structures representing the heterogeneous graph of FIG. 1.

FIG. 1 illustrates an example of a graph generated from corresponding DBMS tables. FIG. 2 illustrates two graphs representing the graph of FIG. 1. An example of a graph is a Compressed Sparse Row extended with Edge identifiers (CSRE) data structure that is used as a use case herein. In an implementation, a single CSRE is composed of three arrays: a source array (srcArray), a destination array (dstArray), and an edge array (edgeArray). The dstArray contains the identifiers of destination vertices. Neighbors of the same source vertex are stored in contiguous entries of dstArray. The srcArray has an entry for each source vertex. Given an index i representing a source vertex, srcArray[i] is the offset of where the neighbors for i start within the dstArray. At index i+1, the srcArray contains the offset where the neighbors stop (e.g., let A be the content of srcArray[i] and B the content of srcArray[i+1], the neighbors for vertex i are stored contiguously from dstArray[A] until dstArray[B]−1). srcArray[i+1] represents the beginning of the neighbors for source vertex i+1. The srcArray contains an additional entry (if |V| is the number of source vertices, srcArray has |V|+1 entries) to store the number of destinations/edges. Similarly to the dstArray, the edgeArray stores the identifiers for the edges connecting a source vertex to its neighbors.

Vertex identifiers (e.g., the elements stored in dstArray) have two uses. First, a vertex identifier i makes it possible to hop to the neighbor of a vertex by jumping to srcArray[i]. Second, a vertex identifier makes it possible to retrieve the vertex properties of a vertex, as a given vertex identifier is mapped to a unique row in a vertex table. On the other hand, edge identifiers (e.g., the elements stored in edgeArray) are not used for topology traversal (e.g., to hop to neighbors). Instead, they are only used to retrieve edge properties.

A CSRE representation is built from DBMS tables, using a graph definition DDL statement that lists information, such as the tables involved in the graph, the PK-FK relationships that connect them, or the columns that are exposed as properties, in an implementation. CSREs are built in main memory and associated with the graph and its creation SCN, in such an implementation.

In an implementation, each element in the graph has an identifier that uniquely identifies the element in the graph. For example, source vertices may be uniquely identified, so no two source vertices have the same unique identifier; similarly, no two destination vertices have the same unique identifier, and similarly, no two edges have the same identifier.

In an implementation, such unique identification is based on the primary keys of the corresponding tables that persistently store the corresponding elements. For example, an image identifier (IMGID) is a unique numeric identifier that represents an element (a vertex or an edge) in a graph element table. There is a one-to-one mapping between an IMGID and a primary key value, and this mapping is maintained through the use of a dictionary (e.g., Global Dictionary (GD)). The insertion of new keys in the graph element table triggers insertions into the GD and the creation of new IMGIDs. IMGID values may be assigned sequentially, starting from 1. Primary keys that are deleted from a graph element table are never removed from the GD. If too many deletions occur, an IMGID re-compaction operation may be triggered: all entries are dropped from the GD, and new entries are created for primary keys that are present in the table only.

DML with a Graph Change

A received query may contain a DML instruction that may affect a maintained graph (change to a vertex and/or an edge). To determine whether the DML instruction affects a graph without impacting the performance of the DML execution, a DML process determines whether the change to object(s) by the DML may cause a graph change without actually performing the graph change itself, in an implementation. In particular, the process determines whether such a change is a topological change to a graph (referred to herein as "graph change"): an insert/delete operation on a source vertex or an insert/delete operation on an edge. An example of non-topological change would be an update of an edge or vertex value.

A DML statement may be compiled once but executed multiple times. An example of such a DML is the statement referencing the same sequence of operations but for different values of an operand. Accordingly, while the statement is compiled once, the statement is executed multiple times. A non-limiting example of a DML statement is one with a parametrized value, e.g., "UPDATE MY_TABLE SET c1=: 1:".

In such an implementation, rather than performing determination for topological change for every DML execution, the existence of graph change is determined only once. At compile time, the DML compile process determines whether or the execution of DML causes a graph change. The subsequent execution of the DML re-uses this determination.

Once the DML process determines that the affected object on the DBMS has corresponding topological graph element(s), the DML process generates an indication of a graph change for the DML and stores the association of the indication with the DML instruction. With the execution of the DML instruction, this indication is propagated to the database change record(s) generated by the execution of the DML instruction. Process(es), other than those executing the DML instruction, then apply the graph change based on the database change records.

Figure 3:
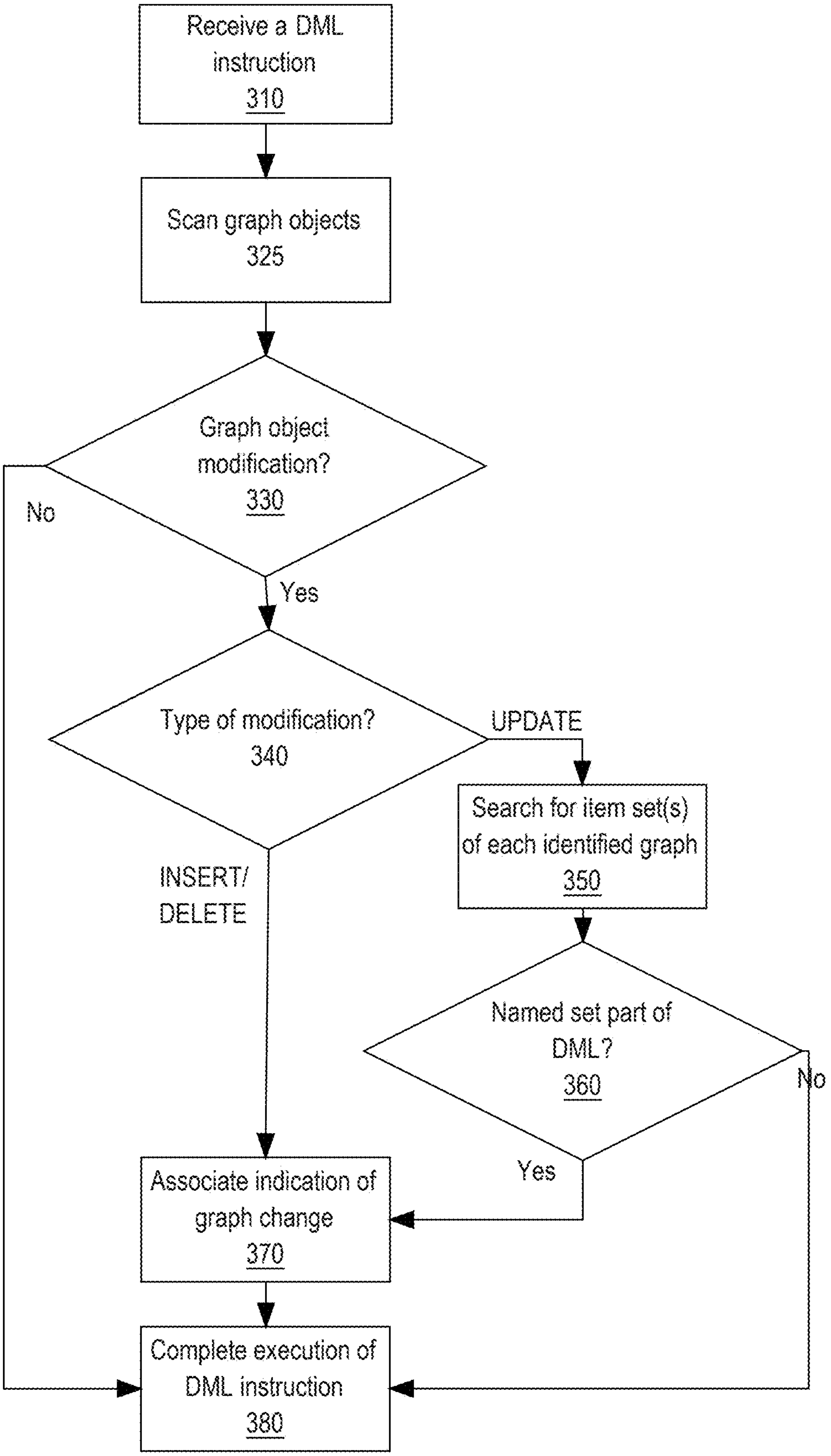
FIG. 3 is a block diagram that depicts a DML process for determining whether a DML instruction causes a graph change, in an implementation.

FIG. 3 is a block diagram that depicts a DML process for determining whether a DML instruction causes a graph change, in an implementation. At step 310, the DBMS receives a query that includes a DML instruction. In an implementation, a DML compilation process determines whether the execution of the DML instruction causes a graph change. To identify any graph change, at step 325, the DML process scans object-to-graph mapping data that maps objects (e.g., database tables) to graph(s).

For example, the object-to-graph mapping data (e.g., a mapping table) may map unique identifiers of database objects of graph elements to the CSREs arrays of the graph elements. The same database object (e.g., a relational table of DBMS) may be involved in different CSREs and may have different roles, e.g., be a source, or a destination vertex table, an edge table, or both an edge and a vertex table.

If the database object being modified by the DML instruction is found in the mapping data at step 330, then the DML process proceeds to step 340. Otherwise, the DML process proceeds to complete the DML instruction.

Continuing with the mapping table example, the DML compiler process may lookup for the object identifier of the table targeted by the DML. If no mapping to CSRE's is found, no topological change is caused by the DML instruction, and the DML process proceeds to complete the DML instruction at step 380. Otherwise, a list of corresponding CSRE graphs may be returned at step 330.

At step 340, if the DML instruction inserts or deletes an item into the object, such as an INSERT/DELETE operation on a table, then the DML instruction adds or removes vertex (ices). Therefore, the DML process proceeds to step 370 to indicate the DML instruction as a graph change operation.

Otherwise, if at step 340, the DML instruction is determined to be an update to an existing item(s), then the DML process proceeds to 350. At step 360, the DML process determines whether various named set(s) of items of object(s) (e.g., columns) referenced by the object-to-graph mapping data match the DML instruction referenced named sets. If there is a match, then the DML instruction updates a vertex or an edge. Additionally, the DML process may determine whether the update to the edge is to the edge itself or the value(s) associated with the edge. If it is determined that the update is to any of the vertices or to the edge itself, the process proceeds to step 370 to indicate the DML instruction as a graph change operation.

Continuing with the in-memory mapping table example, to determine if any of the columns targeted by the update of the DML is impacting the topology of any of the CSRE graphs, the property graph is locked in shared mode, and a boolean flag tracking a topological graph change is initialized to FALSE. The CSREs from the list returned by the mapping table are searched for CSREs used by the property graph. For each such CSRE, the role of the update table is determined. If it is a vertex table, the columns used to define the primary key for that vertex table are searched in the set of columns targeted by the DML update. If at least one is in the DML set of columns, the DML process may stop the scan as a graph change is caused by the DML and the impacted flag is set to TRUE. If the graph element table is an edge table, in addition to the columns used to define the edge table primary key, the columns used to define a foreign key to the source and destination vertex tables are searched in the set of columns targeted by the DML update. If at least one is in the DML set, the DML process may stop, and the impacted graph flag is set to TRUE.

Otherwise, the DML process proceeds to step 380 to complete the execution of the DML instruction.

Generating Transactional Change Record

Any indication of graph change associated with the DML instruction(s) is propagated to the database change record(s). Stated differently, when the DML instruction with the indication of graph change is completed, any change to the database recorded in the database change records is marked with the indication. Such database changes in the records are committed as part of a transaction. A transaction may include a number of DML instructions, and thus, a transaction log may include multiple database change records for a transaction and identify each database change record that causes a graph change. On the other hand, a single DML instruction execution may generate multiple database change records, one for each modified item of an object.

Additionally, the indication of the graph change of a database change record may include an indication of a type of graph change. For an insert of an item that is associated with a graph change indication, a graph element insert indication is associated with the database change record. For a delete of an item, a graph element delete indication is associated with the database change record, and for an update of an item, a graph element update indication is associated with the database change record. If such an update was for an item that was part of an object that is used to generate a graph but is not a topological graph change, an indication of an update of a non-key element is associated with the database change record.

In an implementation, the database change records in the transaction log are arranged by transactions and are further arranged by the database object (or an item thereof) that each database change record is modifying. The timestamp associated with the execution of the transaction is associated with the database change records of the transaction.

One example of a transaction log is a journal of database change records. The journal keeps track of changes made by transaction(s) to row values of columns of tables of database(s) and replicates those changes in in-memory data structures (MF data). The detailed description of journals and in-memory data structures are described in "Mirroring, In Memory, Data From Disk To Improve Query Performance," U.S. patent application Ser. No. 14/337,179, filed on Jul. 21, 2014, referred to herein as "Mirroring Data Application", the entire content of which is incorporated herein by this reference.

In an implementation, a journal for each transaction is extended to store database change records with a graph change indication as described above. Before the transactions are committed, the database changes made by a transaction are stored in the journal for that transaction, along with the determined graph change indication.

Each journal entry may contain all information required to determine (a) what data items are in the entry, (b) what version of those data items the entry reflects, and (c) whether the data items affect the graph and the type of graph change, if any. In one implementation, each journal entry includes:

the rowid of the row associated with the entry, a timestamp that indicates when the data contained in the row was "current", values for one or more columns of the corresponding row and/or graph change indication.

Another example of a transaction log is a redo log, which stores database change records describing the objects changed and associated timestamps of the action.

In an implementation, a graph transactional change record is generated from a transaction log. The process determines the graph change for each database object or the item thereof, especially if multiple changes have occurred to the same database object or the item thereof during a transaction (multiple database change records are stored for the same database object in a transaction log).

Figure 4:
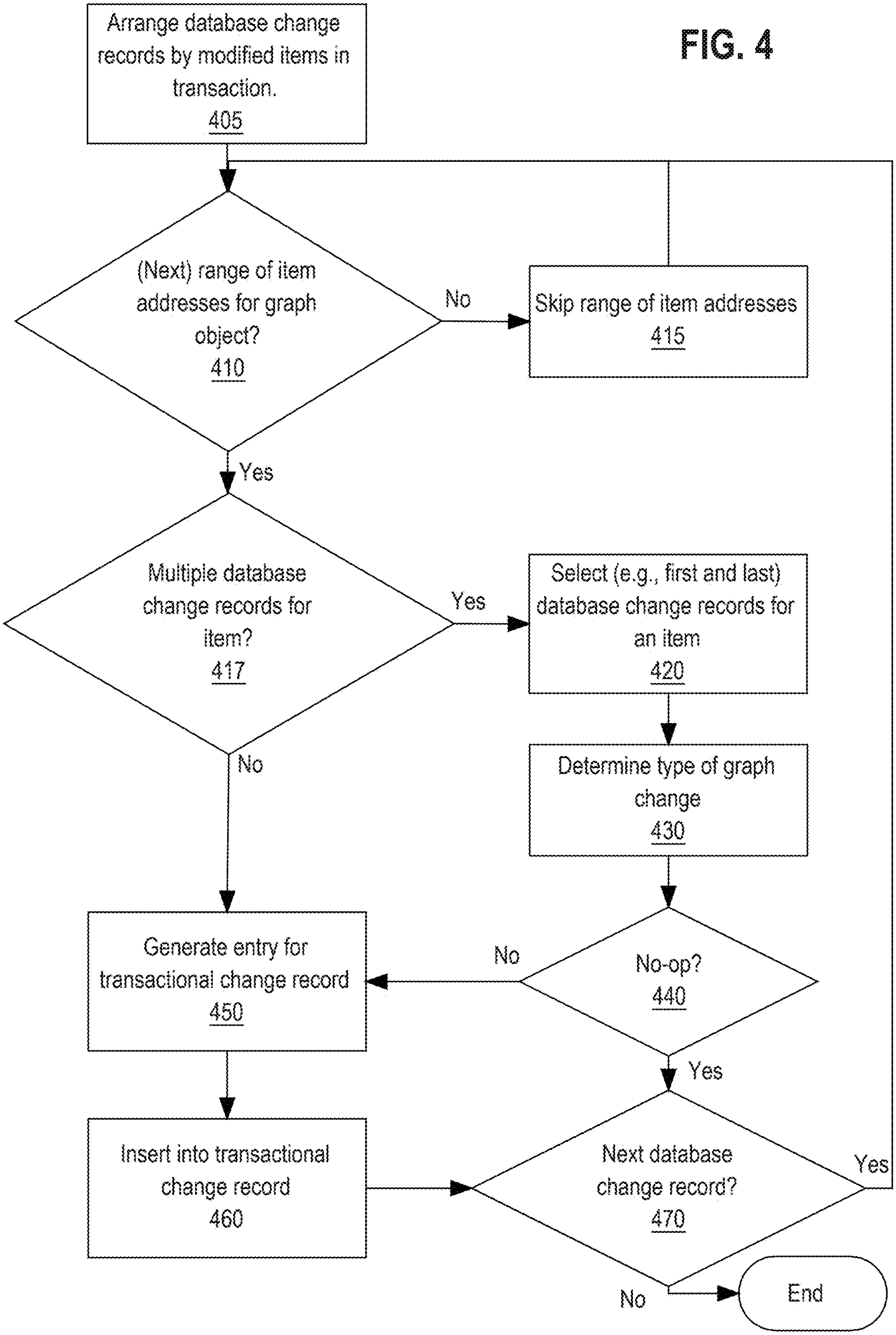
FIG. 4 is a block diagram that depicts a transaction process generating a graph transactional change record, in an implementation.

FIG. 4 is a block diagram that depicts a transaction process generating a graph transactional change record, in an implementation. At step 405, the database change records are arranged by objects or items of objects being modified for each transaction.

In some implementations, the transactional log is already arranged by modified items (or objects thereof) of a transaction. Accordingly, the range of addresses for those items (or corresponding objects) may themselves indicate whether any graph change is caused by the modification. For that reason, at step 410, the process may determine, based on the object-to-graph mapping data, whether the range of addresses/object of item change(s) in the transactional change record causes any graph change. If the range of addresses maps to an object that has a corresponding graph data structure mapped in the object-to-graph mapping data, then the process proceeds to step 417. Otherwise, at step 415, the range is skipped, and the next range of addresses is analyzed at step 410.

At step 417, multiple database change records may exist for a modified item associated with a graph change indication. Accordingly, if it is determined to be so at step 417, at step 420, the first and last database change record may be selected and, based on the first and last database change record for a modified item and/or database object, and regardless of intermediate database change records for the same item/object, the resulting graph change is determined at 430.

At step 430, the process identifies the pattern of operations on the object item, and based on the pattern in Table 1 of the "first opc" and "last opc" column of the respective database change records, determine the graph change operation as recited in the "topological operation" column.

TABLE 1

Inference of topological graph change operation

| Operation sequence patterns | Examples | first opc | Last opc | topological operation |
|---|---|---|---|---|
| (ins[[updnk]upd]* del ins]*) | (ins), (ins del ins), (ins upd del ins), (ins updnk updnk del ins) | ins | ins | $ins_g$ |
| (ins [updnk]upd[del ins]* updnk) | (ins updnk), (ins upd updnk), (ins del ins updnk) | ins | updnk | $ins_g$ |
| (ins [upd]updnk[del ins]* del) | (ins del), (ins updnk del), (ins upd del) | ins | del | $noop_g$ |
| (ins [updnk]upd[del ins]* upd) | (ins upd), (ins updnk upd), (ins upd upd), (ins del ins upd) | ins | upd | $ins_g$ |
| (del [ins]updnk[upd]* del]* ins) | (del ins), (del ins updnk updnk del ins) | del | ins | $upd_g$ |
| (del ins [updnk]upd[del ins]* updnk) | (del ins updnk), (del ins upd updnk) (del ins updnk del ins updnk) | del | updnk | $upd_g$ |
| (del [ins [updnk]upd]* del]*) | (del), (del, ins, del), (del, ins, updnk, updnk, del) | del | del | $del_g$ |
| (del [ins [updnk[upd]* del]*insupd) | (del ins upd), (del, ins, updnk, upd) | del | upd | $upd_g$ |
| (upd([upd[updnk]del ins]* upd]) | (upd), (upd upnk upd), (upd, del, ins, updnk, upd) | upd | upd | $upd_g$ |
| (upd [upd[updnk]del ins]* updnk) | (upd updnk), (upd updnk updnk) (upd del ins updnk), | upd | updnk | $upd_g$ |

TABLE 1-continued

Inference of topological graph change operation

| Operation sequence patterns | Examples | first opc | Last opc | topological operation |
|---|---|---|---|---|
| (upd[upd]updnk[del ins]* del ins) | (upd del ins), (del, ins, updnk, del) | upd | ins | $upd_g$ |
| (upd[upd]updnk[del ins]* del) | (upd del), (upd upnk del), (upd del ins updnk del) | upd | del | $del_g$ |

If the topological operation is "$noop_g$" where "g" stands for a graph change operation, then, at step 440, the process proceeds to step 470, and if the next (set) of database change records exist in the transaction log, then the process proceeds to step 410 to process the next (set) of database change records for the transaction.

Otherwise, if there are no more database change records in the transaction log, at step 450, the process generates an entry for the graph transactional change record that corresponds to the determined graph operation. At step 460, the process appends the generated entry to the graph transactional change record. At step 470, the process repeats the same steps for all database change records in the transaction until a graph transactional change record is generated that contains all the graph changes for the transaction.

Thereby, a graph transactional change record for a transaction is generated by appending entries for each determined graph operation type on the changed database object/item of the database change record(s). The transaction is also identified in the graph transactional change record along with the timestamp at which the database change(s) of the record have been applied (but may not be committed yet).

Figure 5:
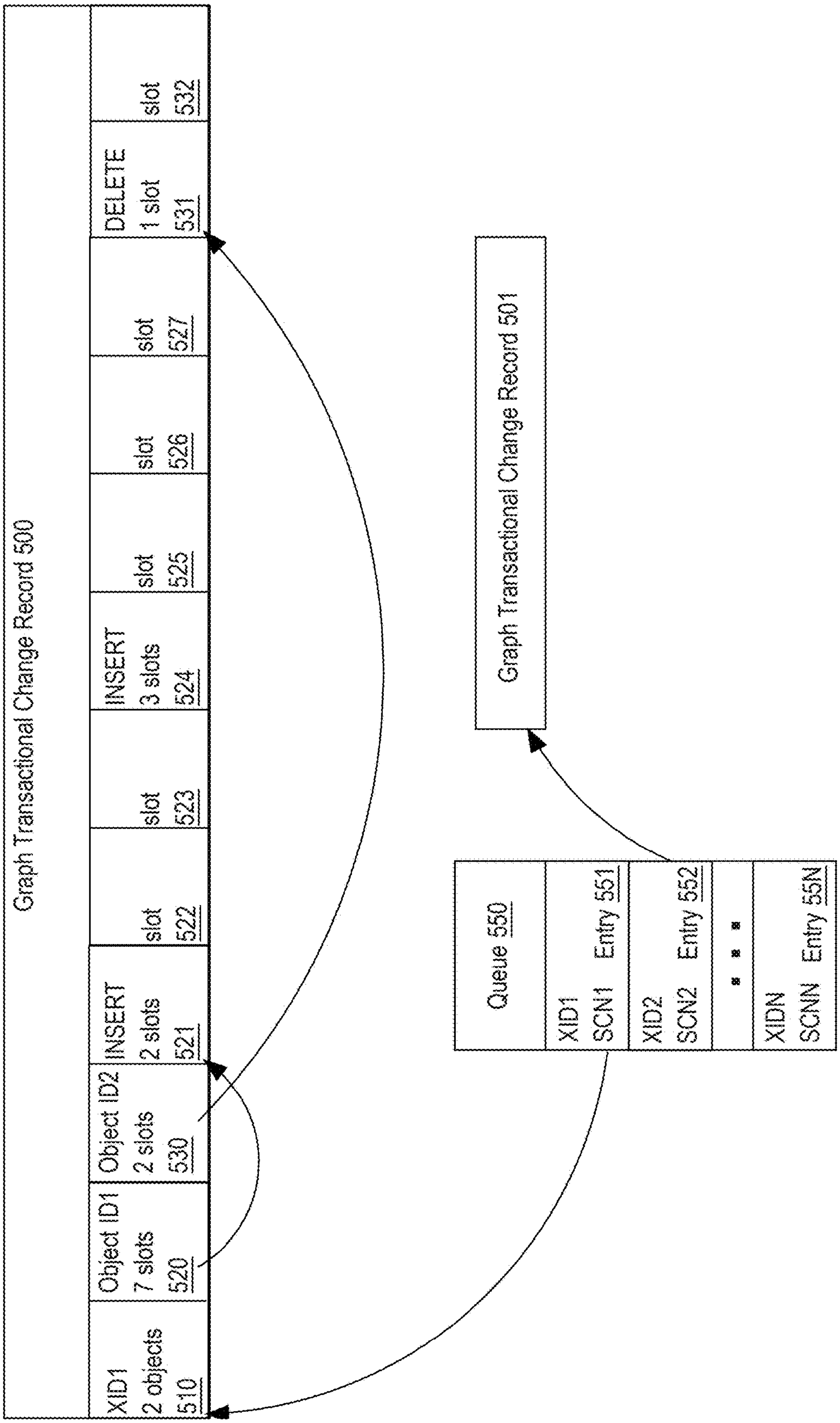
FIG. 5 is a block diagram that depicts an example graph transactional change record for a transaction, in an implementation.

FIG. 5 is a block diagram that depicts an example graph transactional change record for a transaction, in an implementation. Graph transactional change record 500 includes two sections: a changed object description section (combination of 510, 520, 530) and a topological graph change section (combination of 521-27, 531-32). The object description section includes header 510 of record 500, which indicates the number of objects (e.g., tables) changed in the transaction that impact graph topology(ies). Header 510 is followed by an array of individual object descriptions (510, 520) for each of these objects. Each individual object description (510, 520) may contain an object identifier (locator), the number of items changed in the object (e.g., number of blocks containing changes that impact at least one graph topology), and a pointer to the entry(ies) of items themselves (e.g., an offset to the location of the slots for the object) as depicted by an arrow in FIG. 5.

In the example of FIG. 5, the topological graph change sections (521-27 and 531-32) describe the topological graph change corresponding to the changed items of the object referenced in the respective object sections (520 and 530). For 521-27, the object section is 520, and for 531-32, the object section is 530. The topological graph change section includes a sequence of slots that contains changed items of the respective object referenced in the object section. Each graph change section includes a header (e.g., 521) and an array of slots (e.g., 522-23). The header contains the reference to the changed item of the object (e.g., block address relative to a tablespace that may be identified as part of the object identifier in the object header), the number of slots for changed items in the array, and the type of topological change (e.g., "operation" such as INSERT, DELETE or UPDATE).

Accordingly, graph transactional change records track changes based on their impact on the graph topology at the transaction granularity, in an implementation. The same object may appear several times in the record, but the set of modified items (i.e., the slot numbers) for the object should be disjoint, and the operation should be different, in such an implementation. This means that a block of a table may appear at most three times in a single graph transactional change record (i.e., the number of different topological operations).

Scheduling Graph Change

Graph change(s) are scheduled to be applied to the graph(s) using a graph change queue. The graph change queue maintains a queue of the generated transactional change record(s). In an implementation, a set of transaction commit processes schedule graph change(s) of the transaction by inserting the transactional change record of the transaction into the graph change queue. A transaction commit process may have been spawned to prepare and/or commit the transaction referenced in the transactional change record.

In addition to maintaining the order for the application of the transactional change records, the graph change queue maintains information about whether the database change(s) of a transactional change record have been committed and when such a commit occurred. For example, for each graph transactional change record in the queue, the transaction identifier of the transaction and, additionally or alternatively, the timestamp of the queue insertion are stored in an implementation. Using the transaction identifier, the DBMS may determine whether the graph change(s) referenced in the graph transactional change record have been committed and at which timestamp. The timestamp of the insertion of the graph transactional change record into the queue may indicate the staleness of the application of the graph transactional change record.

Continuing with FIG. 5, queue 550 includes entries 551-55N, where N is the number of entries in the queue, in an implementation. Although entries of 551-55N are depicted as contiguous in real implementation, the entries may be a linked-list data structure, with entries stored in different parts of different memories. Each entry contains a pointer to the corresponding graph transactional change record that has been inserted into queue 550, in an implementation. For example, entry 551 references graph transactional change record 500 and contains the transaction identifier of XID1 of graph transactional change record 500 as well as the (pre-) commit SCN of the insertion of the graph transaction change record into queue 550, SCN1.

The entry may contain duplicate information with the graph transactional change record, such as the transaction identifier, to accelerate the determination of whether or not to apply the graph transaction change record to the corresponding graph(s). A process may scan queue 550 and, based on the transaction identifiers in the entries, may quickly determine whether the corresponding transactions have been committed. Other implementations of graph change queue entry may include any range of information from the full graph transactional change record to simply a pointer to one.

Draining Queue of Graph Changes

In an implementation, the set of DML processes and/or the set of commit processes are not the processes that perform the application of the graph changes themselves. To lessen the burden on the DML compilation/execution and for the DML compilation/execution times not to be affected by graph changes, the DML processes only associate the indication of a graph change to the corresponding database object change(s), in an implementation. Similarly, in such an implementation, the transaction commit processes prepare and schedule the graph changes when the transaction is being prepared and/or committed. And, a different set of processes, asynchronous with the DML processing and committing thereof, performs the graph change application.

In an implementation, the processes that are spawned to service graph operation(s) on graph(s), are in the set of processes that traverse the transactional change record(s) and apply the graph change(s). In such an implementation, when a query with a graph operation request is received, the process servicing the graph operation request determines whether any graph change is to be applied to accurately service the request. The determination is made based on the graph(s) referenced by the graph operation and the timestamp as of which the graph operation is requested (or if none is specified in the request, then using the current timestamp). The processes traverse the graph changes in the queue and identify those graph change(s) that are for the referenced graph(s) in the operation as of the timestamp specified by the graph operation.

Allocating Memory for Graph Change Log

In an implementation, the set of processes that is spawned to apply graph changes by graph operations includes an allocating set of processes and a drain set of processes. The allocating set of processes is spawned by graph operation(s) to allocate memory for the graph change application in parallel and concurrent to the drain set of processes. The drain set of processes is spawned by the graph operations to apply the graph changes to generate a graph change log for the graph changes in the allocated memory.

An allocating process determines if an entry in the graph queue qualifies for the request based on the request's timestamp and the referenced graph(s). The allocating process may query the object-to-graph mapping with the object identifier in the graph transactional change record of the entry and retrieve the graph identifier(s) of the affected graph(s). For the affected graph, the allocating process allocates memory in the corresponding graph change log based on the number of graph change operations for the graph.

In an implementation, the set of allocating processes generates draining tasks for the set of draining processes to drain based on the received graph operations and the queue. Entries in the change queue are associated with timestamps obtained at pre-commit (during the queuing), which may be (slightly) older than the actual commit timestamp. Accordingly, an allocating process may compare the requested timestamp in the graph operation with the pre-commit timestamp recorded in the queue entry and, additionally, may retrieve the commit SCN for an accurate comparison. The determination of whether an entry qualifies for draining is made according to the $P_{scn}$ (pre-commit logical timestamp SCN) associated with the queue entry, $C_{scn}$ (logical timestamp SCN of the transaction commit) and $R_{scn}$ (requested graph operation logical timestamp SCN).

The entry is drained if for the entry and/or the corresponding graph transactional change record: $P_{scn} \leq C_{scn} \leq R_{scn}$.

The entry is skipped if: $P_{scn} \leq R_{scn} < C_{scn}$ or $R_{scn} < P_{scn} \leq C_{scn}$.

Accordingly, the allocation process identifies the entry for draining if the requested graph operation timestamp is later than or equal to the commit timestamp of the transaction with the graph changes. Otherwise, the entry is skipped. Then, the subsequent entries are inspected until the last entry of the queue is reached to determine if the commit timestamps of the entries are earlier or the same as the requested timestamp and, thus, have to be allocated. The process may determine to skip an entry without inquiring about the transactional change record's commit time stamp if the pre-commit timestamp of the transaction is later than the requested timestamp because the commit timestamp for such an entry has to be at least as late as the pre-commit timestamp.

In an implementation, for draining transactional change records into the graph change log(s) of the impacted graph (s), an allocation process computes the memory space needed for the new records in the graph change log(s). The object section(s) of a transaction graph change record, such as 520 and 530 of the transactional change record 500 of FIG. 5, is scanned, and the object identifier(s) are used to retrieve the list of graphs that depend on those objects. The memory allocation size may depend on the role of the objects in the respective graph(s). For example, the size of a record in the graph change log is different for a vertex as compared with an edge.

In an implementation, a graph change log record is created in the graph change logs, with a size estimated. The record is set to the state that indicates that the record is not yet ready to be used in the graph operation (e.g., "not ready state"). The record will be in the ready state once properly populated by a draining process.

In an implementation, the set of allocation processes generates drain task(s) for each of the graph change records allocated. The commit timestamp of the corresponding transaction may be the key for the corresponding task in the list of drain tasks. As soon as a drain task is added to the list, a concurrent draining process may start processing the drain task.

Figure 6A:
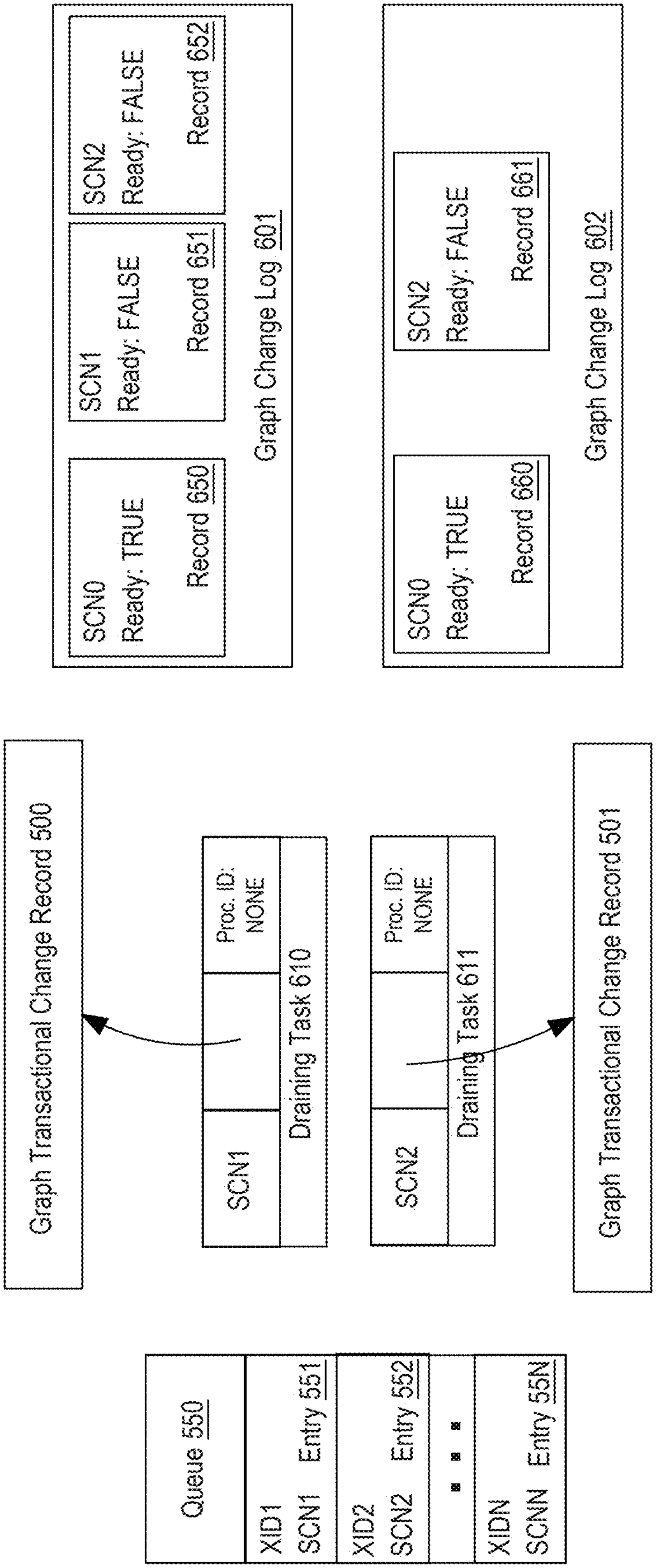
FIGS. 6A/B are block diagrams that depict data structures for generating graph change log records, in an implementation.

FIG. 6A/B are block diagrams that depict data structures for generating graph change log records, in an implementation. A query is received with a graph operation that requests a transactionally consistent CSRE graph, CSRE 2, at a logical timestamp, SCN2. The corresponding graph change log of CSRE 2 is graph change log 602, which last generated (ready state) record 660 has timestamp SCN0, which is earlier than SCN1, which is earlier than SCN2. Graph change queue 550 includes two entries, 551 (record 500) and 552 (record 501), at pre-commit timestamps SCN1 and SCN2, respectively. Those entries are to be drained to satisfy the graph operation with a request SCN of SCN2. Drain tasks 610 and 611 are generated for entry 551 and entry 552, respectively, to drain change queue 550. The creation of drain tasks is performed in the timestamp order (e.g., oldest to newest), i.e., first for entry 551 at SCN1 and then for entry 552 at SCN2.

The allocation process may have reserved records in the corresponding change logs for the drain tasks to populate. Continuing with FIG. 6A, the following space for graph change logs 601 and 602 that are impacted by the graph changes of entries 551 and 552 based on object-to-graph mapping.

- Record 651 is allocated with the ready flag set to FALSE in graph change log 601. Entry 551 impacts graph CSRE 1; thus, memory space for entry 551 is only reserved in graph change log 601 as record 651.
- Entry 552 impacts both graph CSRE 1 and graph CSRE 2, so spaces for entry 552 are reserved in both graph change log 601 as record 652 and graph change log 602 as record 661. Thus, records 652 and 661 are allocated with the ready flags set to FALSE in both graph change logs 601 and 602, respectively.

Generating Graph Change Log

A draining process may, concurrently with the allocating process, traverse the queue of entries and apply the graph change(s) in a graph transaction change record to populate allocated record(s) in the graph change log(s) of the affected graph(s). In an implementation, when multiple draining processes are spawned for the graph operation targeting the same graph, the multiple processes may concurrently drain entries of the queue based on associated timestamps of the entries. In other implementations, the draining process(es) may also perform the allocation, and the allocating and draining steps may be executed in series rather than concurrently.

In an implementation, the process that executes a graph operation traverses the graph change log of the referenced graph for records that qualify for the requested timestamp of the query. If the identified record in the traversal is not in a ready state, the graph process may drain the corresponding drain task identified by the record in the list of drain tasks, thereby executing as a process in the set of draining processes. The draining task is thereby assigned to the draining process by, as an example, associating the draining task with the process identifier. Executing a draining task includes converting the associated graph transactional change record of database operation(s) to record(s) of the graph change log of the graph. In particular, the process maps the affected items of the database objects (e.g., primary keys thereof) to IMGID(s) of the corresponding graph vertices. If a graph transactional change record includes an insert operation on a vertex object of a graph, the process generates a new IMGID for the inserted item. With the identified IMGID, the draining process populates the record, storing the IMGID and the corresponding operation on the vertex or the edge (INSERT, DELETE, UPDATE) in the graph change record. Once populated, the record(s) are set to a ready state.

Figure 6B:
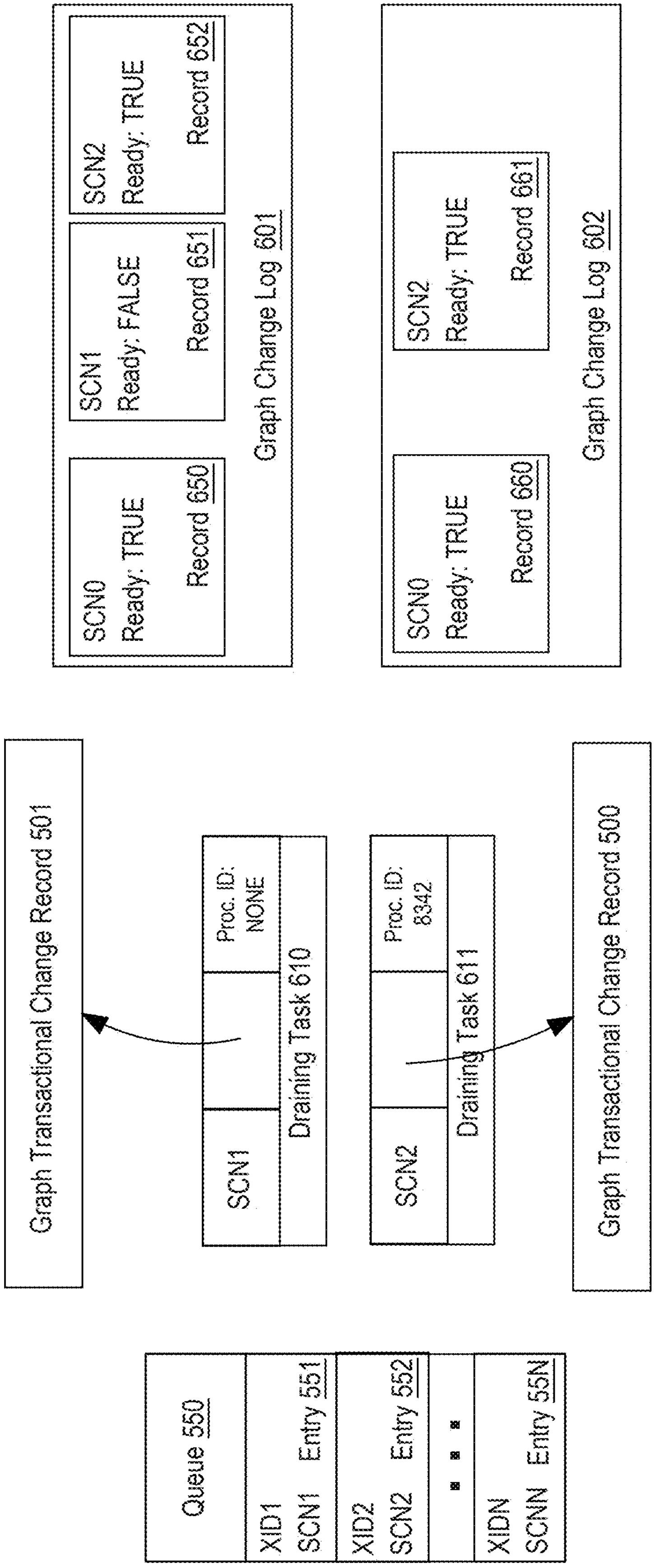

For example, the received query references CSR 2, which corresponding CSRE graph change log is graph change log 602 of FIG. 6A. When scanning graph change log 602, the process reads record 661 for SCN2, which is in not ready state. The process looks up the drain task list for a corresponding task and identifies drain task 611 of FIG. 6A. Drain task 611 is not yet assigned, so it takes ownership of it by writing the process identifier of its process. In FIG. 6B, the process identifier 8342, is written into the drain task 611 to denote to other draining processes that drain task 611 is being serviced by the process, and no other process may perform drain task 611.

Using graph transactional change record 500 associated with drain task 611, the draining process determines the graph changes to be applied. The draining process updates all graph change logs impacted by the graph transactional change record, which, in this example, includes record 652 of Graph Change Log 601 and record 661 of Graph Change Log 602, as depicted in FIG. 6B example. As part of the update, the draining process performs draining task 611 and modifies corresponding graph change log records 652 of graph change log 601 and graph change log record 661 of graph change log 602. The draining process sets the ready state to TRUE, indicating that records are ready for graph operation in records 652 and 661. Accordingly, although the received query only referenced one graph, CSR2, which is associated with graph change log 602, another graph's, 601's, records were also populated because the graph transaction change record 500 affected both graphs.

In an implementation, the draining processes generate topological graph operations based on the information in the graph transaction change record and store the generated graph operations in the graph change log records of all affected graphs. A mapping of item(s) (e.g., row addresses) of the object(s) referenced in a graph transactional change record to the corresponding IMGID(s) using the global dictionaries are generated. The draining process encodes the keys of the impacted rows of the impacted vertex and edge table to IMGIDs. These mappings are performed by minimizing block fetches from the tables and global dictionary lookups. For example, a block is fetched at most twice (once for row values at commit, once for values before the first change by the committed transaction), and the global dictionary lookups for IMGIDs are done in bulk for all row identifiers.

In an implementation, for each object in the object section of the transactional graph change log record, the corresponding set of impacted graphs is determined. The draining process determines the role of the object in an impacted graph (source or destination vertex table or edge table). The draining process maintains a pointer to the next free section of the to-be-populated graph change log record. The next section is a vertex section if the role of the object in the impacted graph is source or destination vertex or an edge section if the role is an edge.

In an implementation, the draining process retrieves the IMGIDs for each item of the object (e.g., arrays of key values for each row of a table referenced in the graph transactional change record) by querying the global dictionaries that map the key values to the IMGIDs. The draining process stores into the appropriate section of the graph change log the retrieved IMGID(s) and the corresponding operation type. For example, for an edge update operation, the draining process retrieves the IMGIDs for the source, destination, and edge of the corresponding primary and foreign keys described in the object table(s) for the row. The draining process then modifies the edge section of the graph change log record with the source and destination vertex IMGIDs, the edge IMGID, and the updated value for the edge. The draining process also indicates in the graph change log record that the operation type is UPDATE. Additionally, The draining process may record an IMGID of zero value for an edge IMGID if the edge is being deleted.

Figure 7:
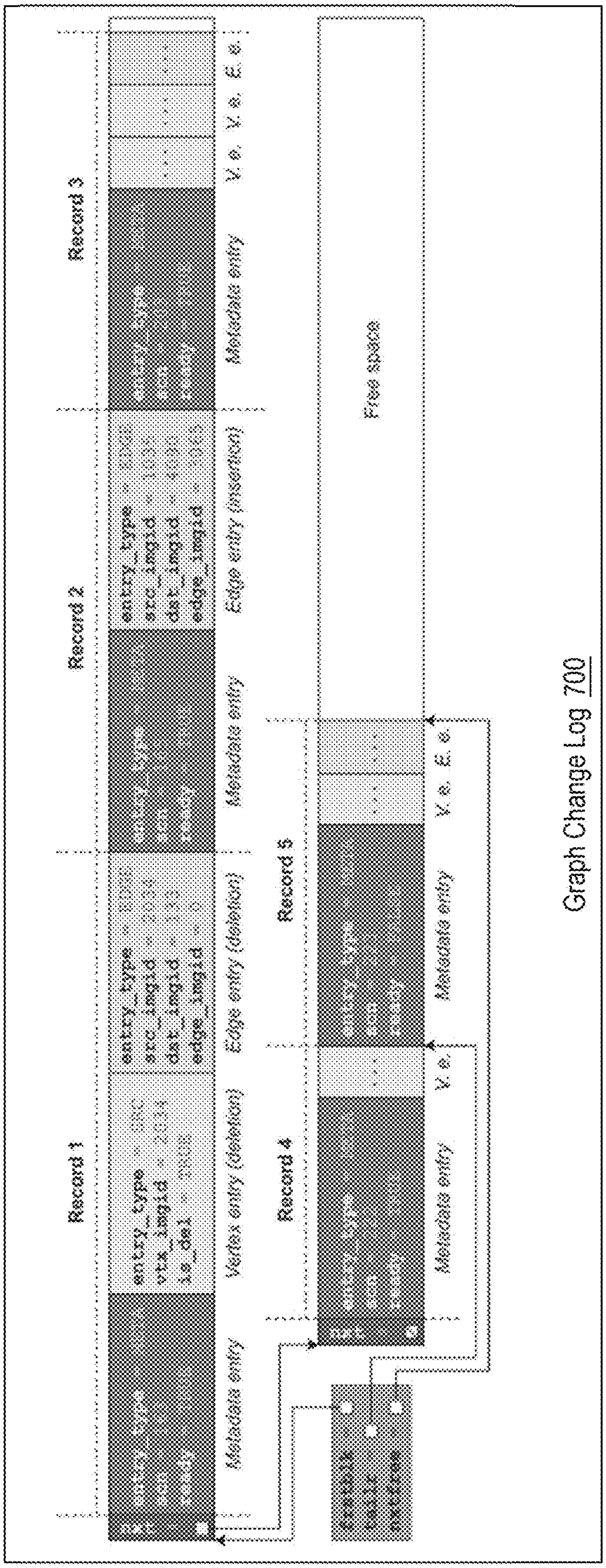
FIG. 7 is a block diagram depicting an excerpt of a graph change log, in an implementation.

FIG. 7 is a block diagram depicting an excerpt of a graph change log, in an implementation. Record 1 of graph change log 700 contains the edge entry section with the edge IMGID, edge_imgid, set to 0, which indicates the deletion of the edge. Record 1's edge entry of graph change log 700 further includes the source and destination vertex IMGIDs as values for src_imgid and dst_imgid to indicate the vertices of the graph, which connecting edge is to be deleted.

Additionally or alternatively, the DBMS may spawn background drain processes to drain the task queue. When no query is received containing a graph operation related to a draining task, the drain task may continue to persist (and if such a query is never received, then the draining task may persist indefinitely). For that reason and as an alternative implementation, DBMS may spawn a set of background drain processes that may select draining tasks to drain solely based on the respective timestamps meeting the criterion of staleness.

For example, if the draining task 610 does not qualify for any graph operation and, at SCN 3, has not yet been drained, a background process may be spawned at any time later than SCN 3 to drain all the draining tasks that have earlier or same SCN 3 timestamp. Drain task 610 qualifies for the background task draining, and therefore, the process identifier of the background process is stored in draining task 610 (not depicted in FIG. 6B). The draining is then performed according to the techniques described herein.

In-Memory Graph Extension

An inflight-extended memory graph is a data structure that augments the base memory graph data structure to incorporate the graph changes captured in the graph change log of the graph. The in-memory graph extension indicates the modified vertices and/or edges of the graph. Additionally, the in-memory graph extension includes additions to the graph, such as information about a new vertex/edge or updated values to an existing vertex/edge as specified in the corresponding graph change log record(s).

The in-memory graph extension may contain multiple data structures based on the types of graph operation(s) in the change log. For example, for vertex/edge insertion, the data representation of new edges and vertices in the graph extension is the same as an arrangement of those of the base memory graph data structure having additional data structure(s) for mapping to the base graph data structure. In an implementation, an in-memory graph extension is implemented as a partial CSRE, which includes dstArray, srcArray, and/or edgeArray, each storing the respective updated information from the graph change log of the graph. Additional array(s) may map the indices of the extended arrays to the IMGIDs of the base graph.

In an implementation, the in-memory graph extension is generated on request, based on the graph operation qualifying one or more records of the graph change log of the graph for accurate traversal of the graph. A graph operation may indicate a requested timestamp for the results. If none is indicated, a current timestamp is presumed. If a target graph of the graph operation has no associated graph change log or has no records in the graph change log as of the requested timestamp, then the in-memory base graph is only used for traversal and generation of the result.

Otherwise, the graph operation is performed by traversing the records of the graph change log of target graph(s) that are earlier than or the same as the requested timestamp. Accordingly, the graph extension is generated for the graph changes as of the requested timestamp.

The process spawned by the graph operation may perform the traversal of the graph change log records and generate the in-memory graph extension(s). The results are generated from the traversal of the base memory graph and the graph extension(s). In an implementation, the graph extension(s) are generated in the private memory of the process and are temporary, thereby deallocated after the results have been generated.

Delete Operation for In-Memory Graph

In an implementation, an in-memory graph extension of a base graph includes a set of indicators that references the vertex (ices) and/or edge(s) that are deleted in the qualifying graph change log records. The reference(s) are generated by processing the qualified delete record(s) in the graph change log. The process for a graph operation scans the records that qualify for the graph operation. When a delete operation record of the graph change log is identified as qualifying for the graph operation, the process generates a reference to a vertex or an edge to be deleted. The reference, indicating the vertex or the edge in the base memory graph, is stored by the process in the in-memory graph extension of the base graph.

Figure 8A:
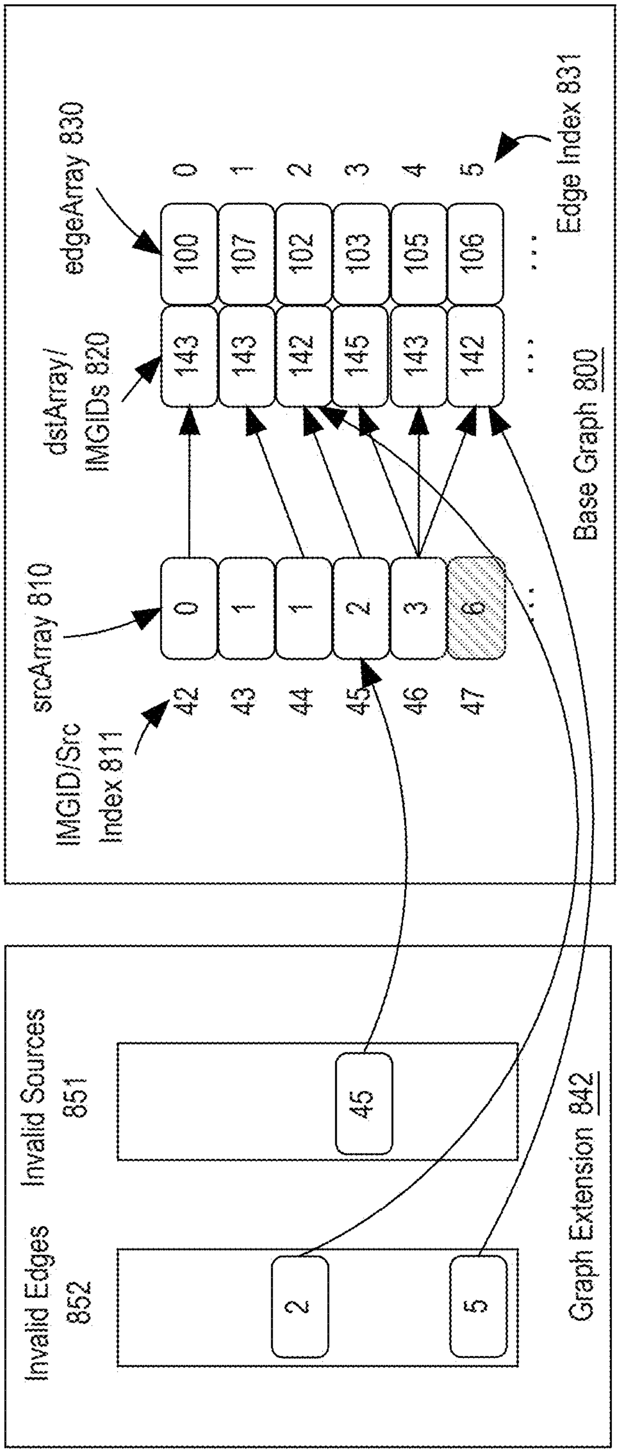
FIG. 8A is a block diagram that depicts an in-memory graph extension that augments the base graph with deletion information in an implementation.

FIG. 8A is a block diagram that depicts an in-memory graph extension that augments the base graph with deletion information in an implementation. Base graph 800 is a CSRE, in which srcArray 810 contains an index of source vertices 811 and values indicating pointers to an array of destination vertices of dstArray 820, each of which corresponding to an edge as specified by the edge array, edgeArray 830, with an index, edge index 831.

Graph Extension 842 is an extension of the CSRE of Base Graph 800 reflecting the deleted entries of the qualified graph change log record(s). The process generates Invalid Sources 851 by identifying delete entries in the graph change log that match the graph operation. For each deleted source vertex entry identified by the process, the process generates a reference in Invalid Sources 851 to the source vertex in the srcArray 810. For example, the graph change log may contain a record that qualified for the graph operation and contains a delete entry for the source vertex with IMGID 45. In an implementation in which Invalid Sources 851 is a bit vector, the bit corresponding to the location of IMGID 45 is set.

Similarly, in an implementation, the process generates elements for Invalid Edges 852 that correspond to the entry(ies) in the record(s) of the graph change log that qualify for the graph operation and which contain a deletion of an edge. The entry may contain the IMGID of a destination vertex to be deleted. The process inserts the reference (s) to the deleted edges (in dstArray 820 and edgeArray 830) into Invalid Edges 852 to the edges.

For example, a qualified graph change log record entry may contain a deletion of the destination vertex with the IMGID of 142. dstArray 820 contains two elements with the destination vertex of 142 corresponding to index 2 and 5 in Edge Index 831. Accordingly, the process adds elements in Invalid Edges 852 that reference the dstArray 820 and edgeArray 830 at the index 2 and 5 of Edge Index 831. In an implementation in which Invalid Edges 852 is a bit vector, the bits at locations 2 and 5 of the bit vector are set.

Modifying Operation for In-Memory Graph Data Structure

In an implementation, for modifying graph change log entry(ies), the in-memory graph extension of a base graph includes a set of indicators that references the vertex (ices) and/or edge(s) that are modified. The process spawned by the graph operation generates the references by scanning the graph change log of the target graph to identify the records and the entries thereof that qualify for the graph operation and contain a modifying operation.

When a modifying operation (e.g., update or insert) entry of the qualifying graph change log record is identified, a graph operation process generates a reference to a vertex or an edge to be modified. If an existing vertex/edge is updated, the reference to the vertex/edge in the base memory graph is generated and stored by the process in the in-memory graph extension of the base graph. Additionally, the changed information for the vertex/edge is stored in the in-memory graph extension in a similar arrangement as the base graph. For example, the modified vertex/edge may be stored as an additional vertex or edge of CSRE.

Figure 8B:
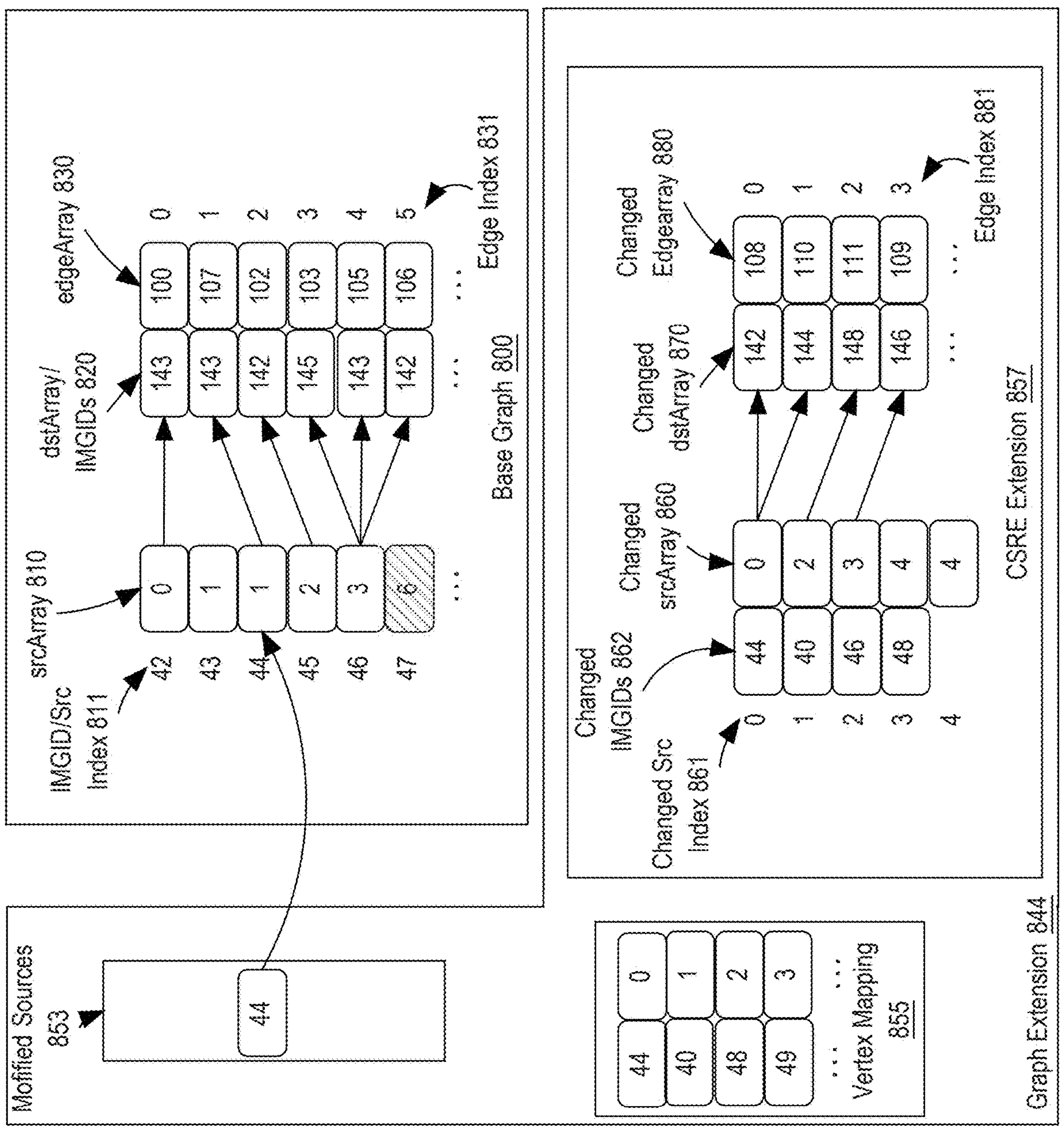
FIG. 8B is a block diagram that depicts an in-memory graph extension that augments a base graph with vertex/edge modification information, in an implementation.

FIG. 8B is a block diagram that depicts an in-memory graph extension that augments a base graph with vertex/edge modification information, in an implementation. Graph Extension 844 is an extension of the CSRE of Base Graph 800 reflecting the modifications to vertex (ices)/edge(s) in the entry(ies) that qualified in the graph change log for the received graph operation.

In an implementation, the process generates Modified Sources 851 by identifying entries of record(s) in the graph change log that match the graph operation for an update of an existing source vertex with an additional edge. For each such identified source vertex entry, the process generates a reference in Modified Sources 853 to the source vertex in the srcArray 810. For example, the graph change log may contain an entry that qualified for the graph operation and contains an update entry for the source vertex with IMGID 44 by adding two additional edges to destination edges with IMGIDs 142 and 144. In an implementation in which Modified Sources 853 is a bit vector, the bit corresponding to the location of IMGID 44 in srcArray may be set to indicate the modified source vertex.

To map an additional edge for the graph to the corresponding source vertex in the base graph, the CSRE extension maintains an additional array aligned with the other array of the CSRE extension, in an implementation. Since the new CSRE extension's source array index does not represent the IMGIDs of the vertices included, the CSRE extension may additionally include another array that is aligned with the CSRE extension arrays in an index and includes the IMGIDs for each source vertex included in the CSRE extension.

Continuing with FIG. 8B, CSRE Extension 857, as compared to the CSRE of Base Graph 800, further includes Changed IMGIDs 862 array. Changed IMGIDs 862 include values that map srcArray 860 vertices to their corresponding IMGIDS.

The new edges are added to Changed dstArray V70 and Changed edgeArray 880 and associated with the modified source vertex in Changed srcArray 860. Changed IMGIDs 862 contain the IMGIDs of the source vertices included in the CSRE extension of Graph Extension 844.

Since the index of the source vertex array in Changed srcArray 860, Changed Source Index 861, is different from the IMGID's in Base Graph 800's Source Index 811, the process may additionally generate vertex mapping data structure and include the mapping between the IMGID's of Source Index V11 and the index of Changed Source Index 861 for the modified source vertex. Such a mapping data structure is Vertex Mapping 855, which maps the same source vertex in Base Graph 800 with the same source vertex in CSRE Extension 857.

To illustrate an example of inserting new edges into CSRE Extension 857 for an existing source vertex, the process identifies a modified source vertex with IMGID 44 in the graph change log record. The process adds entries to Changed IMGIDs 862 having value 44 and to Changed srcArray 860 to indicate the indices of the respective added edges in Edge Index 881. The process adds entries to Changed dstArray 870 for the new destination vertices, having IMGID 142 and 144, and their corresponding edges, having IMGID 108 and 110, in Changed edgeArray 880. To complete the addition of these two new edges to the modified source vertex, the next entry in Changed srcArray 860 is incremented by 2 at Changed Source Index 861 of 1. Additionally, for mapping the vertex IMGID to srcArray 860, Vertex Mapping 855 is augmented with entries mapping IMGID 44 of Base Graph 800 and the value 0 of Changed Source Index of CSRE Extension 857.

Similarly, when inserting a new source vertex, an insert entry of a qualified change log record is identified by a graph operation process. The process inserts the new source vertex into the in-memory graph extension of the entry in the same arrangement as in the base in-memory graph, in an implementation. The entry in the graph change log may contain an insertion of a source vertex alone or with edge(s). If the entry includes a new edge, the edge is also inserted into the in-memory graph extension.

In an implementation, the graph operation process generates CSRE array entries in the in-memory graph extension to represent the source vertex with the edge(s), if any. The IMGIDs for new vertex (ices) (or new edge(s), if present) may already be generated and stored in the entry of the qualified graph change log record. Alternatively, the process may generate such IMGIDs using techniques described herein.

Continuing with FIG. 8B, a graph operation process may identify a graph insertion entry in a qualified graph change log record indicating an insert of a source vertex with IMGID 40 having an edge with IMGID 110 to a destination vertex with IMGID 144. Accordingly, the process inserts entries into CSRE Extension 857 to reflect the insertion as follows. At the next index of 1 of Changed Source Index 861, the process inserts into Changed IMGIDs 862 an IMGID of 40 to reflect the new source vertex. Since the new source vertex has only one edge, at the next index, 2, of Changed srcArray 860, the process inserts a value of 3 to reflect an increment of 1 from the previous index entry of Changed srcArray 860, representing the single inserted edge. The mapping between IMGID 40 of the source vertex and index 1 of Changed srcArray 860 is reflected in Vertex Mapping 855. For inserting the edge to the destination vertex, at the next index of Edge Index 881, 2, of Changed dstArray 870, the process inserts IMGID 148, denoting the destination vertex and inserts IMGID 111 at the same index of Changed edgeArray 880, denoting the new edge. Thereby inserting an additional source vertex with its edge and destination vertex into the graph as part of the CSRE extension.

If no edge is present in the insertion entry of the graph change log, then the process inserts only the new source vertex IMGID into the CSRE of the in-memory graph extension without any modification of the destination or edge representations. For example, for the new source vertex with IMGID 48 at index 3 of Changed Source Index 861, index 4 of Changed srcArray 860 reflects no increment from the previous index, indicating no edge. Accordingly, no destination vertex or edge insertion is performed into Changed dstArray 870 and Changed edgeArray 880.

Traversal of In-Memory Graph

A graph operation process from the set of graph operation processes spawned to service the graph operation request may perform the traversal of the modified graph for the graph operation. The traversal is performed by combining the traversal of the base in-memory graph and the in-memory graph extension generated by the same set of graph operation processes.

When traversing the base memory graph, the process refers to the deleted source vertex and/or edge representations to determine whether to skip the respective source vertex or an edge. In an implementation, in which such representations are bit vectors, the index corresponding to the set bit in the bit vector is skipped in the respective source or edge arrays when traversing the graph.

Similarly, when traversing the base memory graph, the process refers to the modified source representations in the extended memory graph to determine whether the scanned source vertex has been modified to include additional vertex (ices). If so, using the source vertex mapping data structure, the process identifies the corresponding source vertex in the graph extension and traverses the additional edge(s) as identified in the graph extension.

To determine whether there has been any insertion into the base graph, the process scans the graph extension and determines whether the graph extension contains vertex (ices) stored in addition to those that have been modified in the base graph. If any exist, the process scans the additional vertex (ices) and their corresponding edges, if any.

Figure 8C:
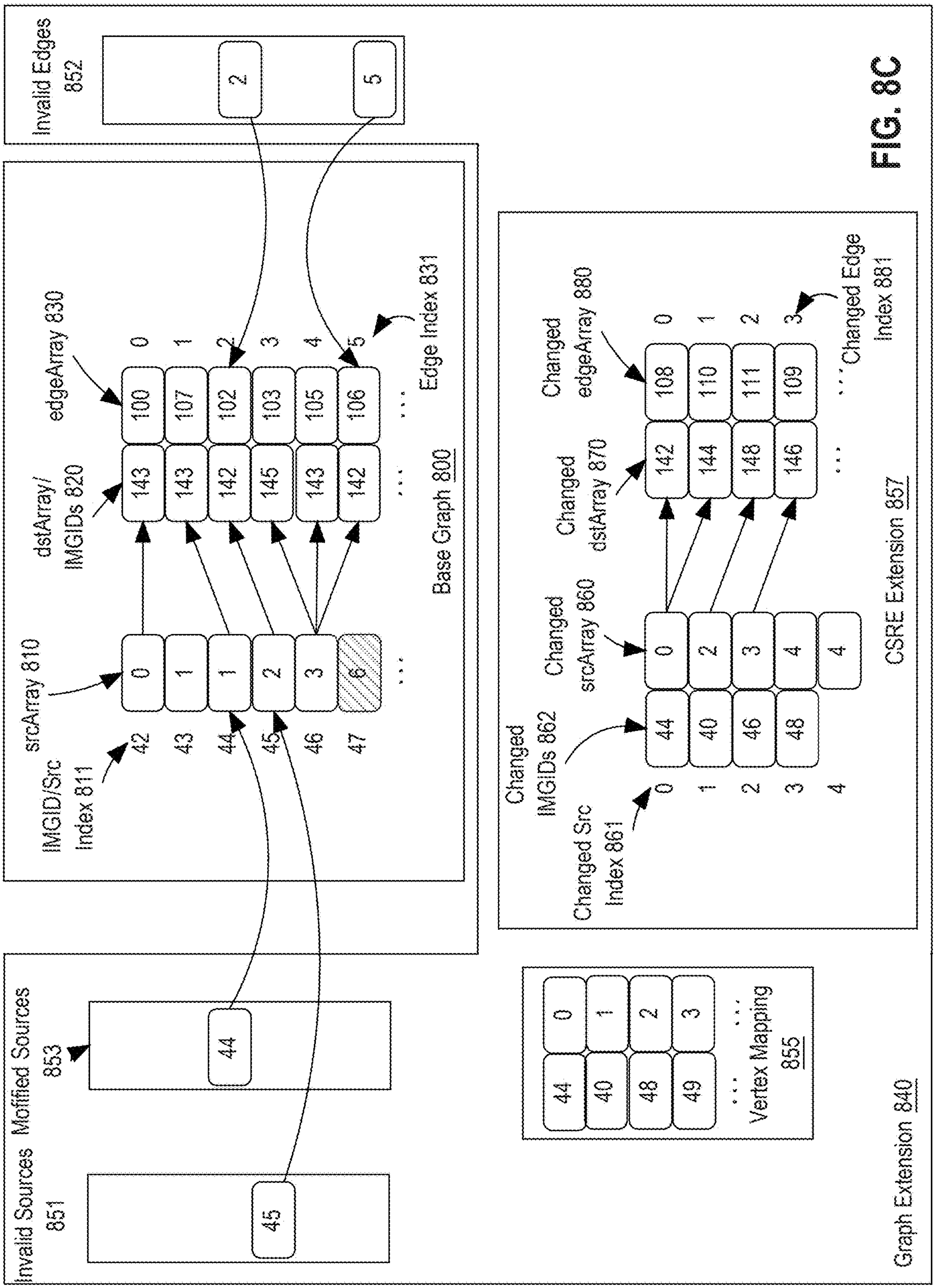
FIG. 8C is a block diagram that depicts a base graph and a graph extension of the base graph, in an implementation.

FIG. 8C is a block diagram that depicts a base graph and a graph extension of the base graph, in an implementation. A set of graph operation processes may generate Graph Extension 840 from the graph change log of Base Graph 800 in response to a query of Base Graph 800 that qualified records of the graph change log. The qualifying may be determined based on comparing the requested timestamp and the timestamp stored in the graph change log record.

Graph Extension 840 in FIG. 8C is a combination of Graph Extension 842 in FIG. 8A and Graph Extension 844 in FIG. 8B. A graph operation process may first traverse Base Graph 800 to generate results for the query. During the traversal, if any of the vertices or edges are referenced by the representations of invalid or changed vertex/edge(s), then the process performs an additional step. The additional step may be skipping the deleted vertex/edge and/or traversing the graph extension.

For example, the process traversing Base Graph 800 scans the source vertex of IMGID 44 of Source Index 811 of srcArray 810. In Modified Sources 853 of Graph Extension 840, this source vertex is indicated as modified. Accordingly, in addition to traversing Base Graph 80's single edge with IMGID 107 in edgeArray 830 to the destination vertex with IMGID 143 in dstArray 820, the process also scans Vertex Mapping 855 of Graph Extension 840 to determine the additional edges for the referenced source vertex. Vertex Mapping 855 indicates that the source vertex with IMGID of 44 corresponds to Changed Source Index of 0. At Changed Source Index 0 of CSRE Extension 857, Changed IMGID 862 indeed contains IMGID 44 and Changed srcArray 860 has value 0 and value 2 at the next index of Changed srcArray 860. Thus, two additional edges are traversed by the process in CSRE Extension 857: an edge to destination IMGID 142 in Changed dstArray 870 with edge IMGID 108 in Changed edgeArray 880, and an edge to destination IMGID 144 in Changed dstArray 870 with edge IMGID 110 in Changed edgeArray 880. Thereby, the process traverses in total three edges, one in Base Graph 800 and two in Graph Extension 840 for the graph operation.

When the process scans the next source vertex at index, IMGID, 45, of srcArray 810, the process identifies that the source vertex is indicated in Invalid Source 851 and therefore is skipped for being deleted.

When the process scans the next source vertex at index, IMGID, 46, the process determines that the source vertex is not referenced in Invalid Sources 851 or Modified Sources 853 of Graph Extension 840. Therefore, the process continues traversing the source vertex by scanning the corresponding entries of srcArray 810 at index 46 and 47 of Source Index 811 to determine that the source vertex has three edges to destination vertices in dstArray 820 with the corresponding edges in edgeArray 830.

The process identifies one of the edge indices of the determined edges that is referenced by Invalid Edges 852. Because the edge from the source vertex of IMGID 46 to the destination vertex of IMGID 142 having an edge of IMGID 106 has Edge Index 831 of 5, which is referenced in Invalid Edges 852, the process skips the edge in the graph traversal.

The process then proceeds to the CSRE Extension 857 to determine if any new source vertices and edges thereof (if any) have been inserted from the graph change log record(s). The process traverses CSRE Extension 857, which additionally includes Changed IMGIDs 862 array of IMGIDs for new or modified source vertex (ices). The process determines that new source vertices have been added based on the presence of IMGID and entries that are not referenced in the Modified Sources 853 array.

Accordingly, the process determines that source vertices with IMGIDs 40, 46, and 48 have been inserted into the graph because their entries are present in Changed IMGIDs 862 and/or Changed srcArray 860 lists. The process traverses the edges based on the corresponding values in the Changed srcArray in the current and next entries corresponding to each new source vertex. For example, the value at index 1 of Changed srcArray 860 corresponding to IMGID 40 is 2, and the next index is 3, thus a single edge, having with IMGID 111 of Changed edgeArray 880, to a destination vertex with IMGID 148 of Changed dstArray 870 at index 2 (the entry value for the source vertex in Changed srcArray 860) of Changed Edge Index 880.

Accordingly, the process traverses a complete graph generated based on Base Graph 800 and Graph Extension 840 that reflects all the committed changes at the requested timestamp of the received graph query.

Database Management System Over View

A database management system (DBMS) manages a database. A DBMS may comprise one or more database servers. A database comprises database data and a database dictionary that are stored on a persistent memory mechanism, such as a set of hard disks. Database data may be organized into database objects and stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology to refer to database objects.

In implementations, the databases may be structured as key-value stores (e.g., NoSQL or JSON) where different database objects may represent different data structures. Key-values and associated objects can be referenced, for example, by utilizing look-up tables such as hash tables.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one implementation, a database language for expressing the query is the Structured Query Language (SQL). There are many different versions of SQL; some versions are standard and some proprietary, and there are a variety of extensions. Data definition language ("DDL") commands are issued to a database server to create or configure database schema, including database containers, such as tables, views, or complex data types. SQL/XML is a common extension of SQL used when manipulating XML data in an object-relational database. Although the implementations of the invention are described herein using the term "SQL," the invention is not limited to just this particular database query language and may be used in conjunction with other database query languages and constructs.

A client may issue a series of requests, such as requests for execution of queries, to a database server by establishing a database session, referred to herein as "session." A session comprises a particular connection established for a client to a database server, such as a database instance, through which the client may issue a series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

Database services are associated with sessions maintained by a DBMS with clients. Services can be defined in a data dictionary using data definition language (DDL) statements. A client request to establish a session may specify a service. Such a request is referred to herein as a request for the service. Services may also be assigned in other ways, for example, based on user authentication with a DBMS. The DBMS directs requests for a service to a database server that has been assigned to running that service. The one or more computing nodes hosting the database server are referred to as running or hosting the service. A service is assigned, at run-time, to a node in order to have the node host the service. A service may also be associated with service-level agreements, which are used to assign a number of nodes to services and allocate resources within nodes for those services. A DBMS may migrate or move a service from one database server to another database server that may run on a different one or more computing nodes. The DBMS may do so by assigning the service to be run on the other database server. The DBMS may also redirect requests for the service to the other database server after the assignment. In an implementation, after successfully migrating the service to the other database server, the DBMS may halt the service running in the original database server.

A multi-node database management system is made up of interconnected nodes that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system may be allocated to running a particular database server's software. Each combination of the software and allocation of resources from a node is a server that is referred to herein as a "server instance" or "instance." A database server may comprise multiple database instances, some or all of which are running on separate computers, including separate server blades.

Software Overview

Figure 9:
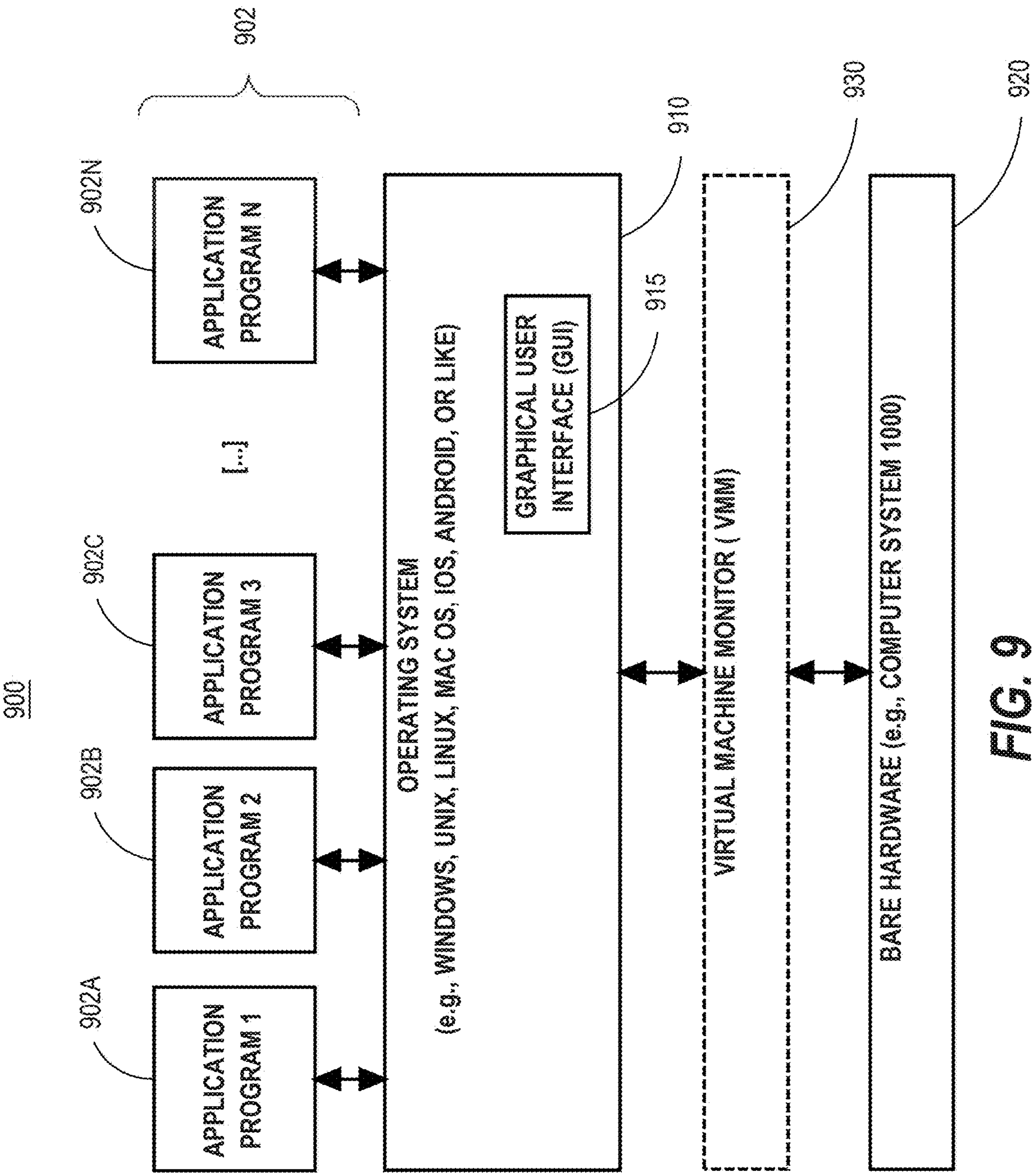
FIG. 9 is a block diagram of a basic software system, in one or more implementations.
Figure 10:
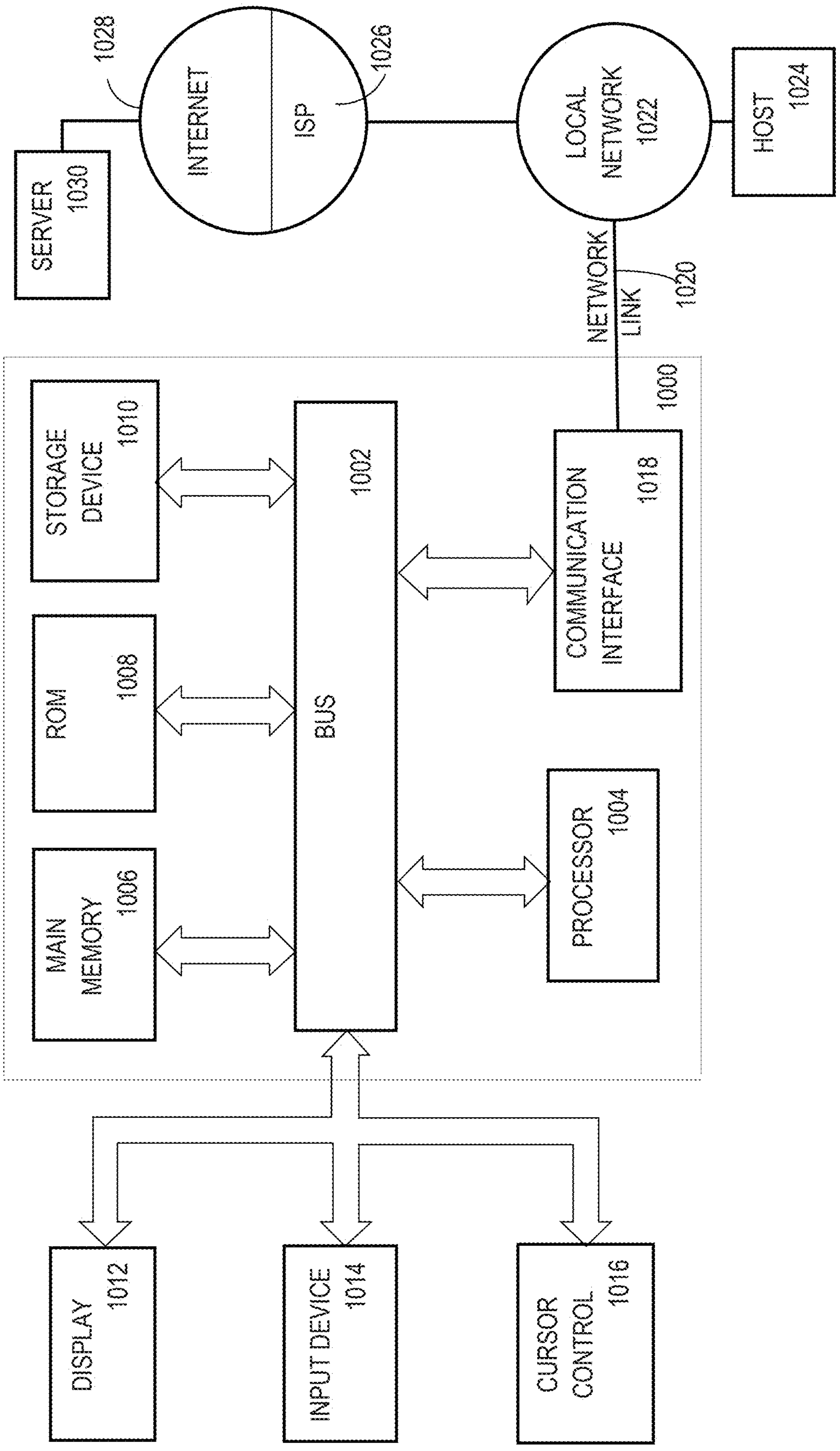
FIG. 10 is a block diagram that illustrates a computer system upon which an implementation of the invention may be implemented.

FIG. 9 is a block diagram of a basic software system 900 that may be employed for controlling the operation of computing system 1000 of FIG. 10. Software system 900 and its components, including their connections, relationships, and functions, are meant to be exemplary only, and not meant to limit implementations of the example implementation(s). Other software systems suitable for implementing the example implementation(s) may have different components, including components with different connections, relationships, and functions.

Software system 900 is provided for directing the operation of computing system 1000. Software system 900, which may be stored in system memory (RAM) 1006 and on fixed storage (e.g., hard disk or flash memory) 1010, includes a kernel or operating system (OS) 910.

The OS 910 manages low-level aspects of computer operation, including managing execution of processes, memory allocation, file input and output (I/O), and device I/O. One or more application programs represented as 902A, 902B, 902C . . . 902N, may be "loaded" (e.g., transferred from fixed storage 1010 into memory 1006) for execution by the system 900. The applications or other software intended for use on computer system 1000 may also be stored as a set of downloadable computer-executable instructions, for example, for downloading and installation from an Internet location (e.g., a Web server, an app store, or another online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 1004) of computer system 1000. Alternatively, a hypervisor or virtual machine monitor (VMM)

930 may be interposed between the bare hardware 920 and the OS 910. In this configuration, VMM 930 acts as a software "cushion" or virtualization layer between the OS 910 and the bare hardware 920 of the computer system 1000.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 1000 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example implementation(s). The example implementation (s), however, are not necessarily limited to any particular computing environment or computing device configuration. Instead, the example implementation(s) may be implemented in any type of system architecture or processing environment that one skilled in the art, in light of this disclosure, would understand as capable of supporting the features and functions of the example implementation(s) presented herein.

Hardware Overview

According to one implementation, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an implementation of the invention may be implemented. Computer system 1000 includes a bus 1002 or other communication mechanism for communicating information, and a hardware processor 1004 coupled with bus 1002 for processing information. Hardware processor 1004 may be, for example, a general-purpose microprocessor.

Computer system 1000 also includes a main memory 1006, such as a random access memory (RAM) or another dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read-only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one implementation, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative implementations, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal, and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026, in turn, provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:

receiving a query having a particular data manipulation language (DML) instruction to execute at a database management system (DBMS), the particular DML instruction referencing a particular object change to a particular object stored in non-volatile memory at the DBMS;

determining that the particular object change, indicated by the particular DML instruction, causes a graph change to an in-memory graph that is stored in volatile memory and is based, at least in part, on the particular object;

wherein source and destination pair vertices of the in-memory graph are data elements related to one another by a data relationship of corresponding data items of one or more objects stored in the non-volatile memory at the DBMS;

completing execution of the query, including executing the particular DML instruction, by a first set of processes, at least by:

performing the particular object change to the particular object in the non-volatile memory without performing the graph change to the in-memory graph in the volatile memory, and generating and associating the particular object change with a graph change indication;

in response to receiving a graph operation on the in-memory graph, performing, by a second set of processes, different from the first set of processes, the graph operation at least by:

based at least in part on the graph change indication, determining that the graph change is to be performed for the in-memory graph in the volatile memory:

performing one or more operations to reflect the graph change to the in-memory graph in the volatile memory.

2. The method of claim 1, wherein executing the particular DML instruction is first executing of the particular DML instruction, the method further comprising:

prior to the completing the first execution of the particular DML instruction, compiling the query with the particular DML instruction;

while compiling the query with the DML instruction, determining that the particular object change, indicated by the particular DML instruction, causes the graph change to the in-memory graph that is based on the particular object;

completing second executing of the particular DML instruction, without recompiling the query with the DML instruction and without re-determining that the particular object change causes the graph change to the in-memory graph.

3. The method of claim 1, further comprising:

the first set of processes generating a set of database change records in transaction log, each database change record, in the set of database change records, representing modification to each respective item of the particular object due to the particular object change to the particular object, and based, at least in part, on determining that the particular object change, indicated by the DML, causes the graph change to the in-memory graph that is based on the particular object, associating, by the first set of processes, said each database change record in the set of database change records in the transaction log with the graph change indication.

4. The method of claim 1, wherein the particular DML instruction is a first DML instruction, the particular object is a first object, the particular object change is a first object change, the graph change is a first graph change, and the method further comprising:

executing a second DML instruction, by the first set of processes, the second DML instruction causing a second object change to the first object and a third object change to a second object;

wherein a transaction includes the second DML instruction and the first DML instruction;

generating a graph transaction change record for the graph change that includes the first object change, the second object change and the third object change in a sequence corresponding to a sequence of requested execution of the first DML instruction and the second DML instruction in the transaction.

5. The method of claim 1, wherein a transaction includes a sequence of object changes including the particular object change, wherein the sequence of object changes is based on a sequence of respective DML instructions, corresponding to each object in the sequence of object changes, in the transaction and the method further comprises:

for a particular item of the particular object, determining a first operation in the sequence of operations and a last operation in the sequence of operations for the transaction;

based on the first operation and the last operation in the sequence of operations and regardless of other operations between the first operation and the last operation for the particular item of the particular object, determining a single operation to perform on the particular item of the particular object for performing the graph change.

6. The method of claim 1, further comprising executing, for a particular transaction, a sequence of DML instructions, including the particular DML instruction, by the first set of processes, the executing of the sequence of DML instructions for the particular transaction causing:

storing a set of database change records to a plurality of rows of a plurality of columns of a plurality of tables in a transaction log for the particular transaction, each database change record, in the set of database change records, representing a corresponding change to a row of a respective column of a respective table;

based, at least in part, on determining, by the first set of processes, that a set of modified columns from the plurality of columns, if modified, causes a in-memory graph change, associating a subset of graph database change records of the set of database change records corresponding to the set of modified columns with the graph change indication;

traversing, by the second set of processes, the subset of graph database change records for the particular transaction grouped based on rows and based on the sequence of DML instructions in the particular transaction, selecting a first database change record and a last database change record for each database change record in the subset of graph database change records;

determining, by the second set of processes, a respective each graph modification operation, of a sequence of graph modification operations, corresponding to said each database change record, in the subset of graph database change records, of the particular transaction, based on the first database change record and the last database change record;

generating a graph transaction change record for the particular transaction based, at least in part, on the sequence of graph modification operations.

7. The method of claim 1, the method further comprising:

generating, by a first process of the second set of processes, a transaction queue by generating, by the first set of processes, a plurality of graph transaction change records, each graph transaction change record of the plurality of graph transaction change records corresponding to a respective transaction having at least one object change corresponding to at least one graph change;

storing, by the first process of the second set of processes, a respective timestamp corresponding to a timestamp of generating said each graph transaction change record and a respective transaction identifier of the respective transaction into said each graph transaction change record;

determining, by a second process, of the second set of processes, different from the first process, one or more graph transaction change records in the transaction queue that include one or more graph changes to the in-memory graph;

based on determining the one or more graph transaction change records in the transaction queue that include the one or more graph changes to the in-memory graph, allocating additional memory, by the second process, of the second set of processes, different from the first process;

wherein the additional memory is allocated to store graph change log to generate in-memory graph extension of the in-memory graph.

8. The method of claim 1, the method further comprising:

executing, by a first process of the first set of processes, a read operation on the in-memory graph, determining, by the first process of the first set of processes, one or more graph transaction change records in a transaction queue that include one or more graph changes to the in-memory graph;

based on determining the one or more graph transaction change records in the transaction queue that include the one or more graph changes to the in-memory graph, generating and storing, by the first process of the first set of processes, a graph record, thereby generating a graph record log of graph records including the graph record, the graph record log representing, at least in part, a sequence of graph changes to the in-memory graph.

9. The method of claim 8, further comprising:

in response to the read operation on the in-memory graph, generating an in-memory graph extension of the in-memory graph.

10. One or more non-transitory computer-readable media storing a set of instructions, wherein the set of instructions includes instructions, which when executed by one or more hardware processors, cause:

receiving a query having a particular data manipulation language (DML) instruction to execute at a database management system (DBMS), the particular DML instruction referencing a particular object change to a particular object stored in non-volatile memory at the DBMS;

determining that the particular object change, indicated by the particular DML instruction, causes a graph change to an in-memory graph that is stored in volatile memory and is based, at least in part, on the particular object;

wherein source and destination pair vertices of the in-memory graph are data elements related to one another by a data relationship of corresponding data items of one or more objects stored in the non-volatile memory at the DBMS;

completing execution of the query, including executing the particular DML instruction, by a first set of processes, at least by:

performing the particular object change to the particular object in the non-volatile memory without performing the graph change to the in-memory graph in the volatile memory, and generating and associating the particular object change with a graph change indication;

in response to receiving a graph operation on the in-memory graph, performing, by a second set of processes, different from the first set of processes, the graph operation at least by:

based at least in part on the graph change indication, determining that the graph change is to be performed for the in-memory graph in the volatile memory;

performing one or more operations to reflect the graph change to the in-memory graph in the volatile memory.

11. The one or more non-transitory computer-readable media of claim 10, wherein executing the particular DML instruction is first executing of the particular DML instruction, and wherein the set of instructions further includes instructions, which when executed by said one or more hardware processors, cause:

prior to the completing the first execution the particular DML instruction, compiling the query with the particular DML instruction;

while compiling the query with the DML instruction, determining that the particular object change, indicated by the particular DML instruction, causes the graph change to the in-memory graph that is based on the particular object;

completing second executing the particular DML instruction, without recompiling the query with the DML instruction and without re-determining that the particular object change causes the graph change to the in-memory graph.

12. The one or more non-transitory computer-readable media of claim 10, wherein the set of instructions further includes instructions, which when executed by said one or more hardware processors, cause:

the first set of processes generating a set of database change records in transaction log, each database change record, in the set of database change records, representing modification to each respective item of the particular object due to the particular object change to the particular object, and based, at least in part, on determining that the particular object change, indicated by the DML, causes the graph change to the in-memory graph that is based on the particular object, associating, by the first set of processes, said each database change record in the set of database change records in the transaction log with the graph change indication.

13. The one or more non-transitory computer-readable media of claim 10, wherein the particular DML instruction is a first DML instruction, the particular object is a first object, the particular object change is a first object change, the graph change is a first graph change, and wherein the set of instructions further includes instructions, which when executed by said one or more hardware processors, cause:

executing a second DML instruction, by the first set of processes, the second DML instruction causing a second object change to the first object and a third object change to a second object;

wherein a transaction includes the second DML instruction and the first DML instruction;

generating a graph transaction change record for the graph change that includes the first object change, the second object change and the third object change in a sequence corresponding to a sequence of requested execution of the first DML instruction and the second DML instruction in the transaction.

14. The one or more non-transitory computer-readable media of claim 10, wherein a transaction includes a sequence of object changes including the particular object change, wherein the sequence of object changes is based on a sequence of respective DML instructions, corresponding to each object in the sequence of object changes, in the transaction, and wherein the set of instructions further includes instructions, which when executed by said one or more hardware processors, cause:

for a particular item of the particular object, determining a first operation in the sequence of operations and a last operation in the sequence of operations for the transaction;

based on the first operation and the last operation in the sequence of operations and regardless of other operations between the first operation and the last operation for the particular item of the particular object, determining a single operation to perform on the particular item of the particular object for performing the graph change.

15. The one or more non-transitory computer-readable media of claim 10, wherein the set of instructions further includes instructions, which when executed by said one or more hardware processors, cause:

executing, for a particular transaction, a sequence of DML instructions, including the particular DML instruction, by the first set of processes, the executing of the sequence of DML instructions for the particular transaction causing:

storing a set of database change records to a plurality of rows of a plurality of columns of a plurality of tables in a transaction log for the particular transaction, each database change record, in the set of database change records, representing a corresponding change to a row of a respective column of a respective table;

based, at least in part, on determining, by the first set of processes, that a set of modified columns from the plurality of columns, if modified, causes a in-memory graph change, associating a subset of graph database change records of the set of database change records corresponding to the set of modified columns with the graph change indication;

traversing, by the second set of processes, the subset of graph database change records for the particular transaction grouped based on rows and based on the sequence of DML instructions in the particular transaction, selecting a first database change record and a last database change record for each database change record in the subset of graph database change records;

determining, by the second set of processes, a respective each graph modification operation, of a sequence of graph modification operations, corresponding to said each database change record, in the subset of graph database change records, of the particular transaction, based on the first database change record and the last database change record;

generating a graph transaction change record for the particular transaction based, at least in part, on the sequence of graph modification operations.

16. The one or more non-transitory computer-readable media of claim 10, wherein the set of instructions further includes instructions, which when executed by said one or more hardware processors, cause:

generating, by a first process of the second set of processes, a transaction queue by generating, by the first set of processes, a plurality of graph transaction change records, each graph transaction change record of the plurality of graph transaction change records corresponding to a respective transaction having at least one object change corresponding to at least one graph change;

storing, by the first process of the second set of processes, a respective timestamp corresponding to a timestamp of generating said each graph transaction change record and a respective transaction identifier of the respective transaction into said each graph transaction change record;

determining, by a second process, of the second set of processes, different from the first process, one or more graph transaction change records in the transaction queue that include one or more graph changes to the in-memory graph;

based on determining the one or more graph transaction change records in the transaction queue that include the one or more graph changes to the in-memory graph, allocating additional memory, by the second process, of the second set of processes, different from the first process;

wherein the additional memory is allocated to store graph change log to generate in-memory graph extension of the in-memory graph.

17. The one or more non-transitory computer-readable media of claim 10, wherein the set of instructions further includes instructions, which when executed by said one or more hardware processors, cause:

executing, by a first process of the first set of processes, a read operation on the in-memory graph, determining, by the first process of the first set of processes, one or more graph transaction change records in a transaction queue that include one or more graph changes to the in-memory graph;

based on determining the one or more graph transaction change records in the transaction queue that include the one or more graph changes to the in-memory graph, generating and storing, by the first process of the first set of processes, a graph record, thereby generating a graph record log of graph records including the graph record, the graph record log representing, at least in part, a sequence of graph changes to the in-memory graph.

* * * * *